US011956081B2

(12) United States Patent
Paris et al.

(10) Patent No.: US 11,956,081 B2
(45) Date of Patent: Apr. 9, 2024

(54) RELIABILITY OF MULTI-CONNECTIVITY

(71) Applicant: NOKIA TECHNOLOGIES OY, Espoo (FI)

(72) Inventors: Stefano Paris, Vanves (FR); Qiyang Zhao, Antony (FR); Daniela Laselva, Klarup (DK); Kalle Petteri Kela, Kaarina (FI)

(73) Assignee: Nokia Technologies Oy, Espoo (FI)

( * ) Notice: Subject to any disclaimer, the term of this patent is extended or adjusted under 35 U.S.C. 154(b) by 73 days.

(21) Appl. No.: 17/634,842

(22) PCT Filed: Aug. 14, 2019

(86) PCT No.: PCT/EP2019/071791
§ 371 (c)(1),
(2) Date: Feb. 11, 2022

(87) PCT Pub. No.: WO2021/028032
PCT Pub. Date: Feb. 18, 2021

(65) Prior Publication Data
US 2022/0345244 A1    Oct. 27, 2022

(51) Int. Cl.
*H04L 1/00*    (2006.01)
*H04L 1/08*    (2006.01)
(Continued)

(52) U.S. Cl.
CPC ........... *H04L 1/0076* (2013.01); *H04L 1/08* (2013.01); *H04L 69/28* (2013.01); *H04W 28/0231* (2013.01)

(58) Field of Classification Search
CPC .... H04W 28/0231; H04L 1/0076; H04L 1/08; H04L 69/28
(Continued)

(56) References Cited

U.S. PATENT DOCUMENTS 6,977,934 B1 * 12/2005 Dalby .................... H04L 65/80
375/E7.025
9,515,787 B2 * 12/2016 Ratasuk ................ H04L 5/0007
(Continued)

OTHER PUBLICATIONS

Office Action for European Application No. 19755870.3, dated May 9, 2023, 3 pages.
(Continued)

*Primary Examiner* — Shelly A Chase
*Assistant Examiner* — Osman M Alshack
(74) *Attorney, Agent, or Firm* — Barta Jones, PLLC

(57) ABSTRACT

Disclosed are two methods, the first method comprising receiving a plurality of data packets, producing a coded data packet by coding together at least two data packets, wherein at least one of the at least two data packets is comprised in the received plurality of data packets or in a coding buffer, transmitting the at least two data packets to a first subset of legs, transmitting the coded data packets to a second subset of legs, and determining if the at least two data packets are to be duplicated based on, at least partly, one or more of the following: a notification, a condition, or a first indication. The second disclosed method comprises receiving a data packet and an indication of a coding function and parameters used for coding two or more data packets, determining if the received data packet is a coded data packet and if it is, determine if one or more internal buffers comprise a minimum set of data packets for generating the coded data packet, using sequence numbers assigned to each data packet, and if the one or more internal buffers comprise the minimum set of data packets, retrieve the minimum set of data packets from the one or more internal buffers, and decoding the coded data packet using the minimum set of data packets and the coding function and parameters indicated by the indication received.

20 Claims, 15 Drawing Sheets

(51) Int. Cl.
*H04L 69/28* (2022.01)
*H04W 28/02* (2009.01)

(58) Field of Classification Search
USPC .................................................. 714/748–750
See application file for complete search history.

(56) References Cited

U.S. PATENT DOCUMENTS

| | | | | |
|---|---|---|---|---|
| 9,559,724 | B2* | 1/2017 | Caillerie | H03M 13/2927 |
| 10,412,151 | B2* | 9/2019 | Dao | H04L 1/1829 |
| 2006/0168240 | A1* | 7/2006 | Olshefski | H04L 69/163 |
| | | | | 709/227 |
| 2010/0226243 | A1* | 9/2010 | Lee | H04L 1/1867 |
| | | | | 370/216 |
| 2012/0201147 | A1* | 8/2012 | Williams | H04L 47/34 |
| | | | | 370/252 |
| 2015/0236819 | A1* | 8/2015 | Zhovnirnovsky | H04L 1/0041 |
| | | | | 370/216 |
| 2018/0234880 | A1* | 8/2018 | Jiang | H04W 28/04 |
| 2018/0270679 | A1* | 9/2018 | Laselva | H04W 36/0088 |
| 2018/0367288 | A1* | 12/2018 | Vrzic | H04W 36/22 |
| 2019/0007866 | A1* | 1/2019 | Agarwal | H04L 1/08 |
| 2019/0097754 | A1* | 3/2019 | Yu | H04L 1/20 |
| 2019/0313287 | A1* | 10/2019 | Li | H04W 28/18 |
| 2019/0335441 | A1* | 10/2019 | Bai | H04L 5/0053 |
| 2020/0178241 | A1* | 6/2020 | Wu | H04W 72/21 |
| 2021/0152298 | A1* | 5/2021 | Beale | H04L 1/1835 |

OTHER PUBLICATIONS

International Search Report and Written Opinion for International Application No. PCT/EP2019/071791, dated Apr. 21, 2020, 15 pages.

3GPP TSG RAN Meeting #81, RP-181690; "Clarification of Objectives of the IIoT Rel-16 Study", Agenda Item: 9.3.12; Source: Huawei, HiSilicon; Gold Coast, Australia; Sep. 10-13, 2018; 2 pages.

3GPP TSG RAN Meeting #84; R2-191346; "Network Coding for Release 17 IAB", Newport Beach, California, USA; Agenda Item: 8; Source: Intel Corporation; Jun. 3-6, 2019; 8 pages.

* cited by examiner

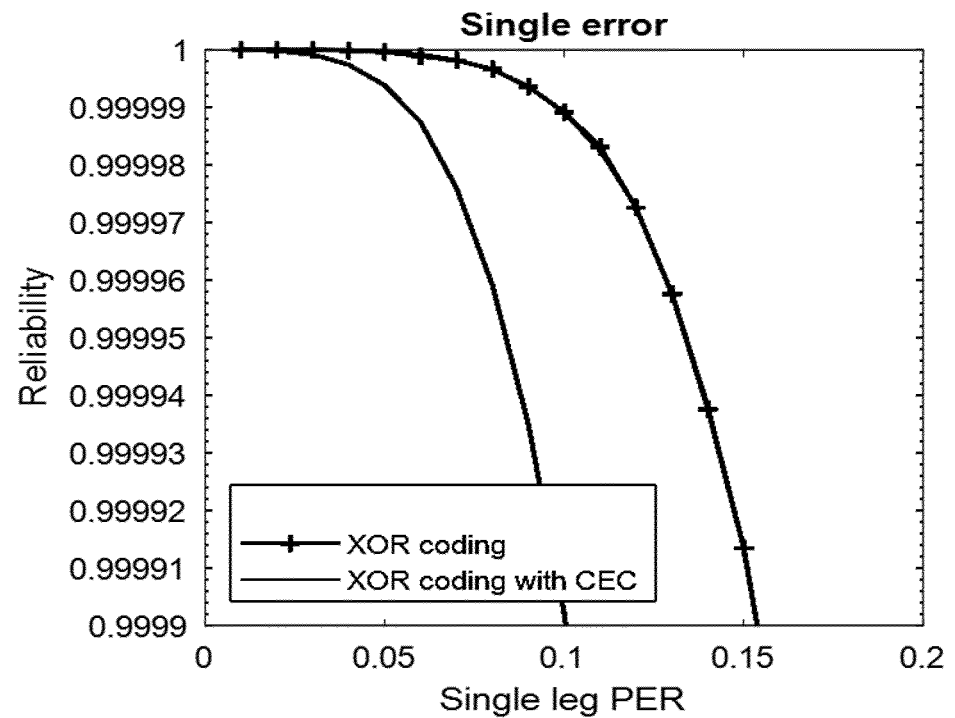
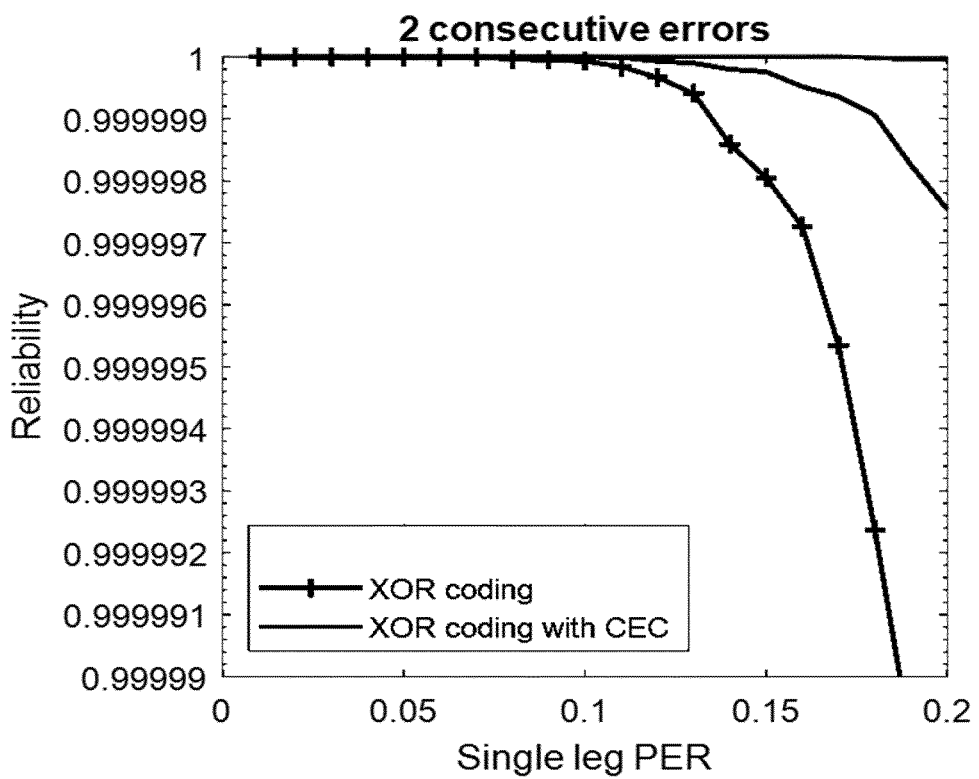
Figure 10

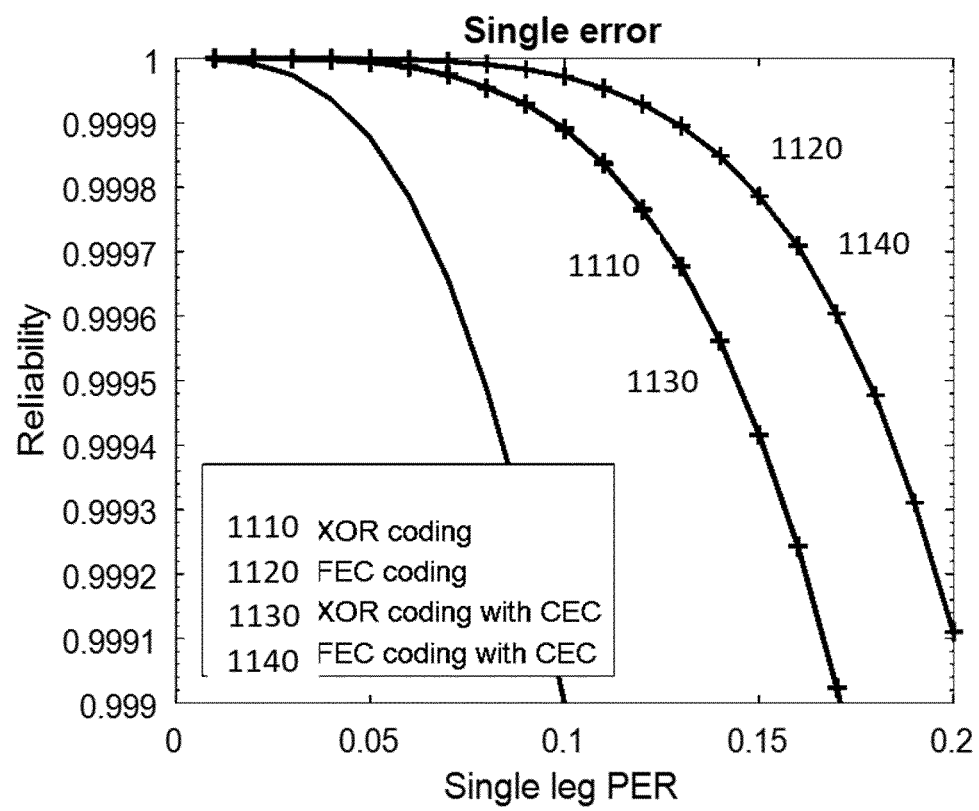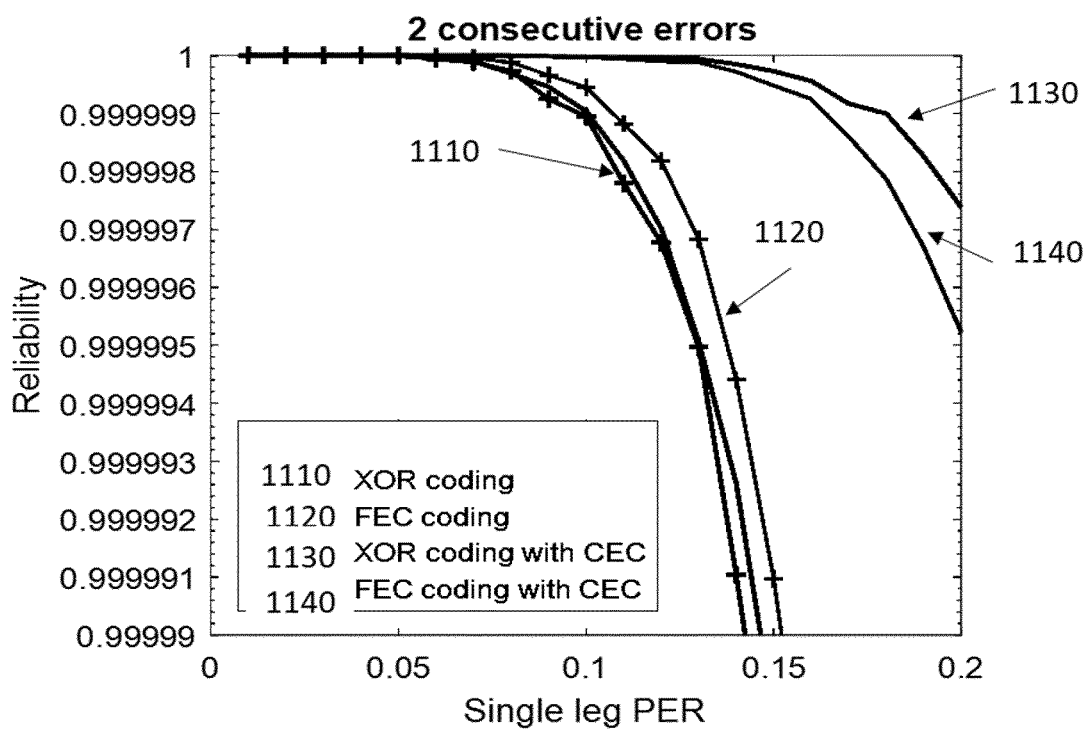
Figure 11

RELIABILITY OF MULTI-CONNECTIVITY

CROSS-REFERENCE TO RELATED APPLICATIONS

This application is a national stage entry of International Application No. PCT/EP2019/071791, filed Aug. 14, 2019, entitled "IMPROVED RELIABILITY OF MULTI-CONNECTIVITY" which is hereby incorporated by reference in its entirety.

FIELD

The following exemplary embodiments relate to reliability of connectivity in a cellular communication network.

BACKGROUND

As resources are limited, it is desirable to optimize the usage of network resources. A cell in a cellular communication network may be utilized such that better service may be provided to one or more terminal devices. The optimization of the usage of one or more cells may therefore enable better usage of resources and enhanced user experience to a user of a terminal device.

BRIEF DESCRIPTION OF THE INVENTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to another aspect there is provided an apparatus comprising means for receiving a plurality of data packets, producing a coded data packet by coding together at least two data packets, wherein at least one of the at least two data packets is comprised in the received plurality of data packets or in a coding buffer, transmitting the at least two data packets to a first subset of legs, transmitting the coded data packet to a second subset of legs; and determining if the at least two data packets are to be duplicated based on, at least partly, one or more of the following: a notification, a condition, or a first indication.

According to another aspect there is provided an apparatus comprising means for receiving a data packet and an indication of a coding function and parameters used for coding two or more data packets, determining if the received data packet is a coded data packet and if it is, determine if one or more internal buffers comprise a minimum set of data packets for generating the coded data packet, using sequence numbers assigned to each data packet, and if the one or more internal buffers comprise the minimum set of data packets, retrieve the minimum set of data packets from the one or more internal buffers, and decoding the coded data packet using the minimum set of data packets and the coding function and parameters indicated by the indication received.

According to another aspect there is provided an apparatus comprising at least one processor, and at least one memory including a computer program code, wherein the at least one memory and the computer program code are configured, with the at least one processor, to cause the apparatus to: receive a plurality of data packets, produce a coded data packet by coding together at least two data packets, wherein at least one of the at least two data packets is comprised in the received plurality of data packets or in a coding buffer, transmit the at least two data packets to a first subset of legs, transmit the coded data packet to a second subset of legs, and determine if the at least two data packets are to be duplicated based on, at least partly, one or more of the following: a notification, a condition, or a first indication.

According to another aspect there is provided an apparatus comprising at least one processor, and at least one memory including a computer program code, wherein the at least one memory and the computer program code are configured, with the at least one processor, to cause the apparatus to: receive a data packet and an indication of a coding function and parameters used for coding two or more data packets, determine if the received data packet is a coded data packet and if it is, determine if one or more internal buffers comprise a minimum set of data packets for generating the coded data packet, using sequence numbers assigned to each data packet, and if the one or more internal buffers comprise the minimum set of data packets, retrieve the minimum set of data packets from the one or more internal buffers, and decode the coded data packet using the minimum set of data packets and the coding function and parameters indicated by the indication received.

According to another aspect there is provided a method comprising receiving a plurality of data packets, producing a coded data packet by coding together at least two data packets, wherein at least one of the at least two data packets is comprised in the received plurality of data packets or in a coding buffer, transmitting the at least two data packets to a first subset of legs, transmitting the coded data packet to a second subset of legs, and determining if the at least two data packets are to be duplicated based on, at least partly, one or more of the following: a notification, a condition, or a first indication.

According to another aspect there is provided a method comprising receiving a data packet and an indication of a coding function and parameters used for coding two or more data packets, determining if the received data packet is a coded data packet and if it is, determine if one or more internal buffers comprise a minimum set of data packets for generating the coded data packet, using sequence numbers assigned to each data packet, and if the one or more internal buffers comprise the minimum set of data packets, retrieve the minimum set of data packets from the one or more internal buffers, and decoding the coded data packet using the minimum set of data packets and the coding function and parameters indicated by the indication received.

According to another aspect there is provided a computer program product readable by a computer and, when executed by the computer, configured to cause the computer to execute a computer process comprising receiving a plurality of data packets, producing a coded data packet by coding together at least two data packets, wherein at least one of the at least two data packets is comprised in the received plurality of data packets or in a coding buffer, transmitting the at least two data packets to a first subset of legs, transmitting the coded data packet to a second subset of legs, and determining if the at least two data packets are to be duplicated based on, at least partly, one or more of the following: a notification, a condition, or a first indication.

According to another aspect there is provided a computer program product readable by a computer and, when executed by the computer, configured to cause the computer to execute a computer process comprising receiving a data packet and an indication of a coding function and parameters used for coding two or more data packets, determining if the received data packet is a coded data packet and if it is, determine if one or more internal buffers comprise a minimum set of data packets for generating the coded data packet, using sequence numbers assigned to each data packet, and if the one or more internal buffers comprise the minimum set of data packets, retrieve the minimum set of data packets from the one or more internal buffers, and decoding the coded data packet using the minimum set of data packets and the coding function and parameters indicated by the indication received.

According to another aspect there is provided a computer program product comprising computer-readable medium bearing computer program code embodied therein for use with a computer, the computer program code comprising code for executing receiving a plurality of data packets, producing a coded data packet by coding together at least two data packets, wherein at least one of the at least two data packets is comprised in the received plurality of data packets or in a coding buffer, transmitting the at least two data packets to a first subset of legs, transmitting the coded data packet to a second subset of legs, and determining if the at least two data packets are to be duplicated based on, at least partly, one or more of the following: a notification, a condition, or a first indication.

According to another aspect there is provided a computer program product comprising computer-readable medium bearing computer program code embodied therein for use with a computer, the computer program code comprising code for executing receiving a data packet and an indication of a coding function and parameters used for coding two or more data packets, determining if the received data packet is a coded data packet and if it is, determine if one or more internal buffers comprise a minimum set of data packets for generating the coded data packet, using sequence numbers assigned to each data packet, and if the one or more internal buffers comprise the minimum set of data packets, retrieve the minimum set of data packets from the one or more internal buffers, and decoding the coded data packet using the minimum set of data packets and the coding function and parameters indicated by the indication received.

LIST OF DRAWINGS

In the following, the invention will be described in greater detail with reference to the embodiments and the accompanying drawings, in which FIG. 1 illustrates an exemplary embodiment of cellular communication network.

FIGS. 8-11 illustrate reliability measurement results of exemplary embodiments.

DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

Figure 1:
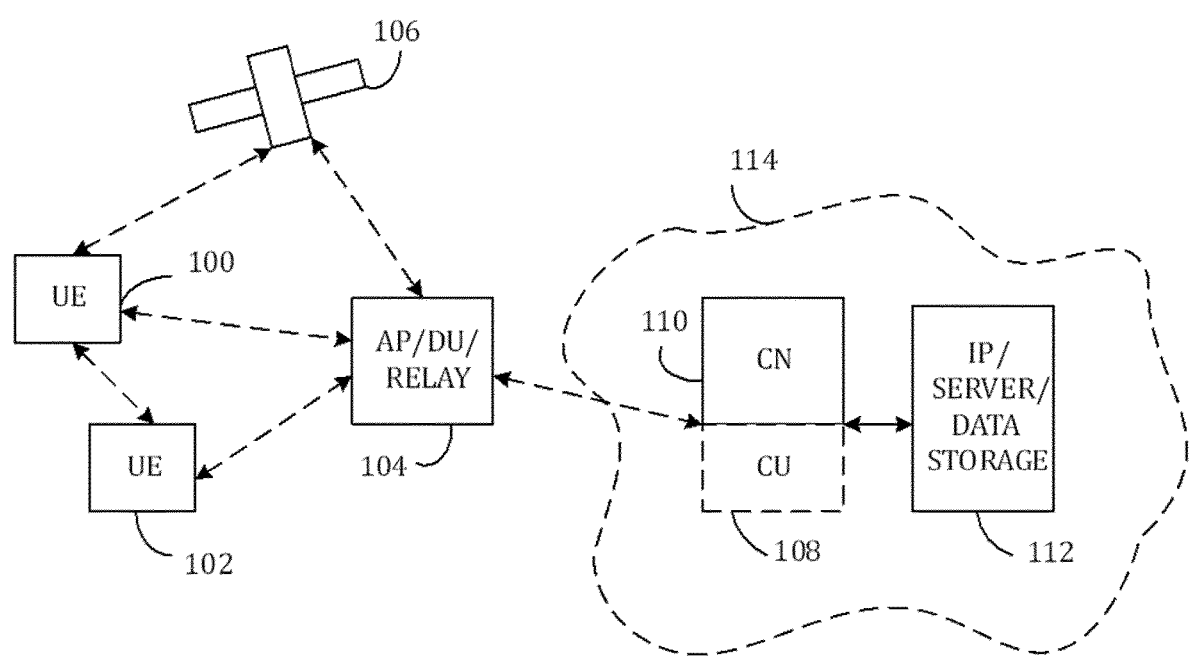

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although only one cell is discussed in this exemplary embodiment, for the sake of simplicity of explanation, multiple cells may be provided by one access node in some exemplary embodiments.

A communication system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device typically refers to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is to be noted that the depicted system is only an example of a part of a radio access system and in practice, the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home(e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In order to better utilize resources of a cell provided by an access node such as e/gNodeB, carrier aggregation may be utilized. Carrier aggregation, CA, enables higher data transmission rates to be used for a terminal device served by the access node by enabling the terminal device to transmit and receive of data on multiple component carriers from the access node. This is illustrated in FIG. 2a. Access node 210 provides component carriers 212 and 214 that may be used by the terminal device 220 to transmit and receive data. It is to be noted that although two component carriers 212 and 214 are illustrated in FIG. 2A, there may be more component carriers that are provided by the access node 210 and used by the terminal device 220 to transmit and receive data.

Carrier aggregation therefore may assign a plurality of component carriers to one terminal device. A component carrier may be understood as a frequency block and the plurality of component carriers in the carrier aggregation may therefore each be different frequency blocks thereby increasing the bandwidth that may be utilized for data transmission and receival between the access node 210 and the terminal device 220. Various types of carrier aggregation may exist. For example, so called intra-band contiguous carrier aggregation in which the plurality of component carriers are contiguous in the same frequency band. In another example, the plurality of component carriers are separated by gap within the same frequency band. This type of carrier aggregation may be called as intra-band non-contiguous. In yet another example, in so called inter-band carrier aggregation the plurality of component carriers are in different frequency bands.

Figure 2B:
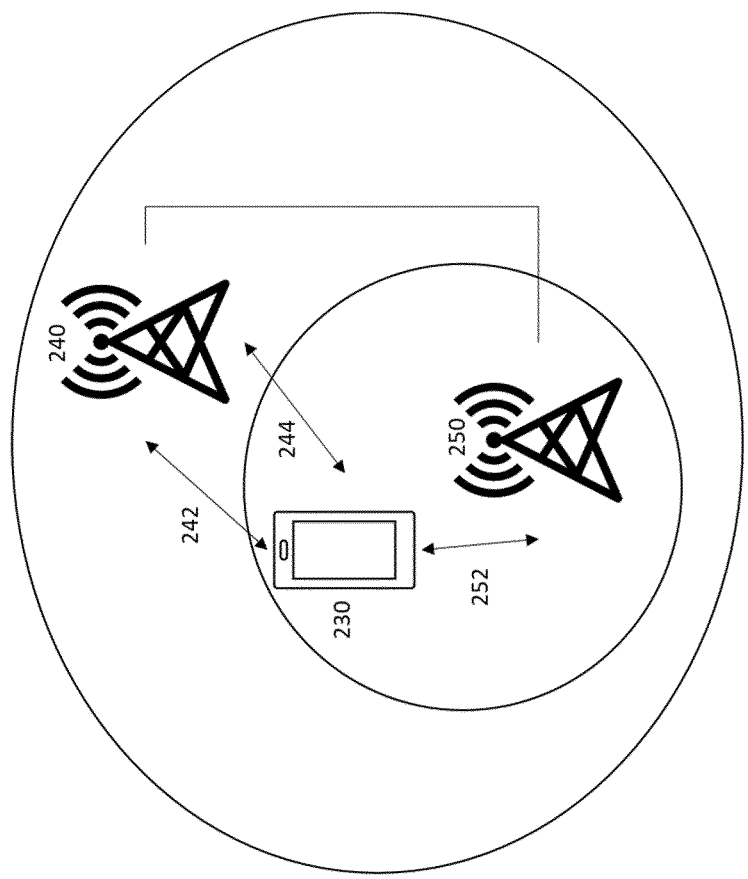
FIGS. 2a and 2b illustrate exemplary embodiments of carrier aggregation and dual connectivity.
Figure 2A:
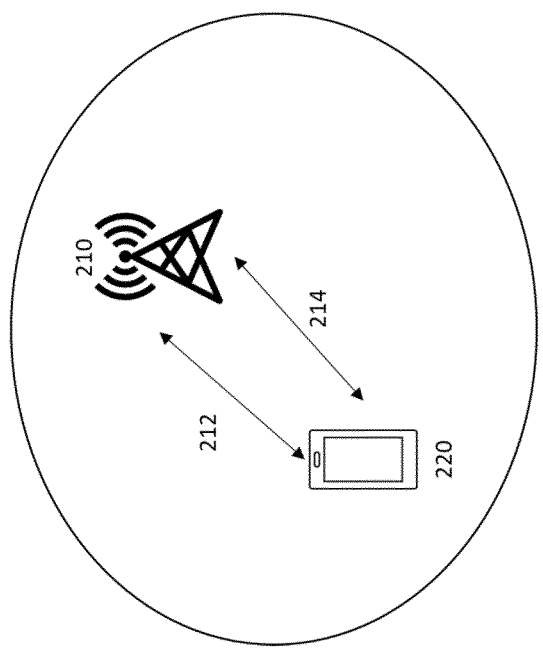

FIG. 2b illustrates dual connectivity. In dual connectivity the terminal device 230 may transmit and receive data from two access nodes 240 and 250 simultaneously. One of the two access nodes may in such exemplary embodiment act as a master access node, which may also be called as a primary access node, through which the connectivity to the secondary access node may be handled. In this exemplary embodiment access node 240 is the master access node. As in dual connectivity a terminal may utilize resources from two radio sites, it may also be referred to as inter-site carrier aggregation. In the exemplary embodiment of FIG. 2b, the component carriers that may be used by the terminal device are the component carriers 242, 244 and 252.

The access nodes 240 and 250 may be any suitable access nodes such as e/gNodeB. In this exemplary embodiment, the access node 240 is an eNodeB and the access node 250 is a gNodeB. The access node 240 thereby provides a larger cell coverage than the access node 250. Access node 250 then on the other hand provides greater capacity than access node 240. In other words, while 4G may provide coverage, 5G may be utilized for capacity for the terminal device 230 thereby allowing 5G to utilize existing 4G infrastructure. The terminal device 230 may therefore, by utilizing dual connectivity, benefit from two different cell sites simultaneously.

As mentioned above, the geographical coverage of a cell provided by an access node may vary. For example, a 4G cell may have a greater coverage area than a 5G cell and/or one 5G cell may have greater cell coverage than another 5G cell. A small cell may therefore be understood to refer to a cell that has a smaller geographical coverage area than another cell. In some exemplary embodiments a macrocell is a cell with the greatest geographical coverage area of a plurality of cells and the smaller cell may be called as small cells. Therefore, a macrocell may cover a geographical area that comprises multiple small cells such as femtocells, picocells and/or microcells. Utilization of small cells may allow the same frequencies of an available frequency spectrum to be re-used within the coverage area provided by the macrocell.

Dual connectivity may help to increase the aggregated bandwidth which may result in increased throughput and/or reliability as well as reduced latency. For example, 3GPP NR R15 (TS 38.323) proposes an exemplary embodiment of dual connectivity architecture. In some dual connectivity exemplary embodiments a terminal device is connected to for example two access nodes, gNodeBs, and may thereby be connected to multiple carrier components within each gNodeB.

Figure 3:
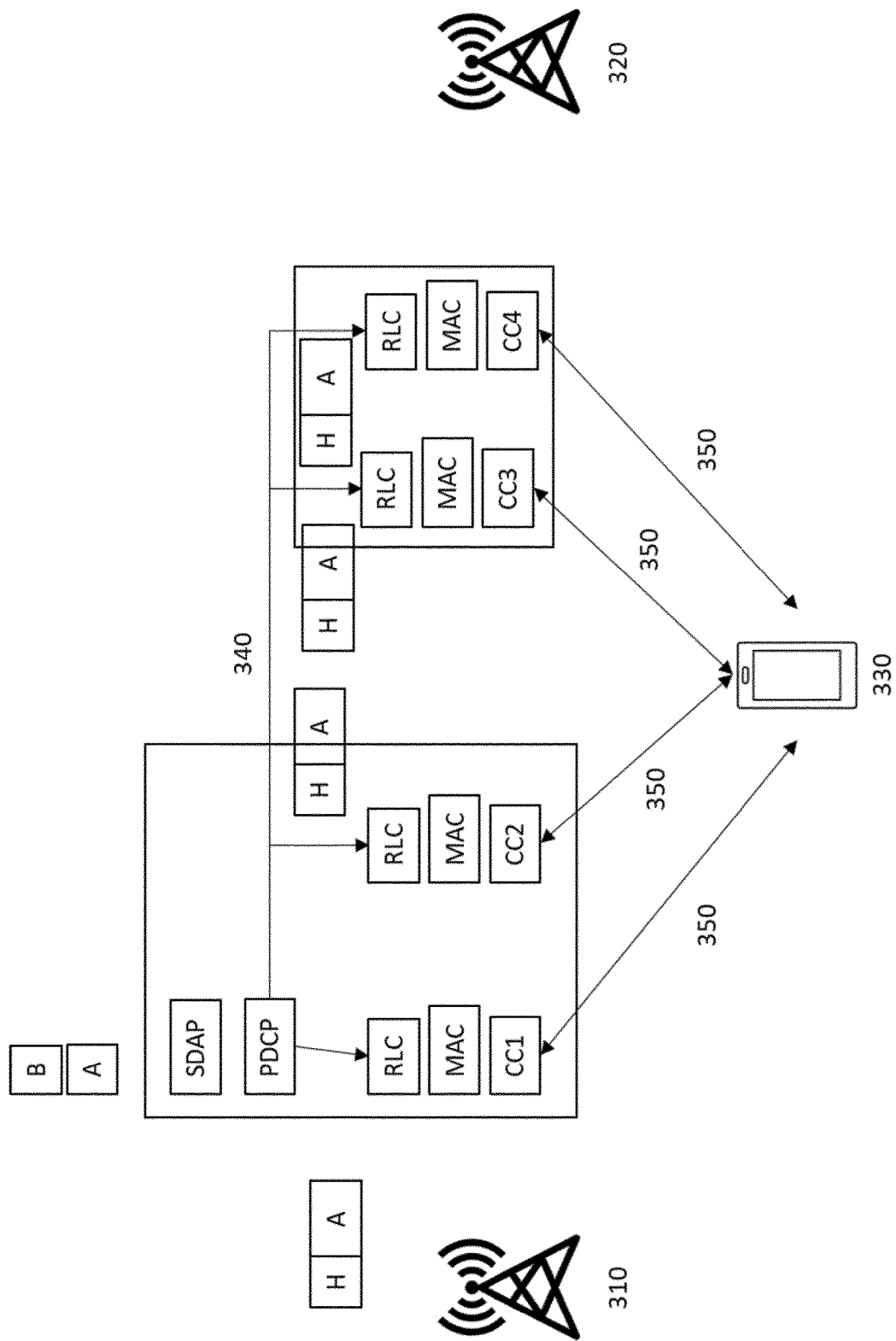
FIG. 3 illustrates an exemplary embodiment of PDCP Duplication over four legs.

FIG. 3 illustrates an exemplary embodiment in which a terminal device 330 is connected to an access node 310, which in this exemplary embodiment is a gNode B, and to another access node 320, which is this exemplary embodiment is another gNode B. It is to be noted that access nodes 310 and 320 could alternatively be any other type of access nodes capable suitable for dual connectivity. The access node 310 in this exemplary embodiment is a master gNode B, MgNB, and the access node 320 is a secondary gNode B, SgNB. The MsNB hosts a service data adaptation, SDAP layer, which receives downlink data packages from the core network and passes the data packages on to a packet data convergence protocol, PDCP, layer which is also hosted by the MgNB. The PDCP layer controls the duplication of data packets. The MgNB further hosts a radio resource control, RRC, control plane that is used for connection and signalling with the terminal device 330. The RRC plane may, in some exemplary embodiments, be considered as the main RRC plane. In this exemplary embodiment, the MgNB initiates a dual-connectivity setup with the SgNB for the terminal device 330. In some alternative exemplary embodiments, the MgNB may initiate dual connectivity setups also with additional secondary access nodes in addition to the SgNB. Those additional secondary access nodes may also be secondary gNodeBs. An interface 340 is, in this exemplary embodiment, used to connect the MgNB and the SgNB and to transfer PDCP packet data units, PDUs duplicated at the MgNB to an associated radio link control, RLC, layer hosted by the SgNB. The MgNB may additionally activate more than one secondary cells, SCells, on the SgNB. The RRC control plane messages are transmitted primarily by a Primary Cell, PCell. The PCell is provided by the MgNB that may, in some exemplary embodiments, provide a plurality of cells among which one is the PCell. In some exemplary embodiments, the terminal device 330 may have two RRC connections when using dual connectivity, one to each access node. It is to be noted that in some exemplary embodiments, there may be multiple secondary cells, in carrier aggregation mode, configured on either node or on both the MgNB and the SgNB, which may increase bandwidth or exploit spatial diversity to enhance reliability and performance.

As described above, in this exemplary embodiment, the PDCP duplication is operated in a way that the PDCP layer in MgNB duplicates the downlink traffic that is then delivered on radio links 350, that are referred to as transmissions legs from here on, that connect different cells to the terminal device 330. In some exemplary embodiments, the node hosting the PDCP layer performing duplication may be the SgNB. In this exemplary embodiment, there are four legs in the combination of dual connectivity combined with carrier activation. Likewise, in the uplink, the MgNB and/or SgNB may indicate to the terminal device 330 to duplicate uplink traffic by activating data duplication and/or by activating certain legs. The RRC signaling may be utilized for the activation of such indication(s). When using data duplication, the data reliability may thereby be increased in case of packet failures occurring on some legs. This duplication mechanism may be supported for example for a maximum of 2 legs (i.e. 2 copies) like described in the 3GPP Release 15 of NR and LTE. In some alternative exemplary embodiments, the mechanism may be extended up to N legs, where N is larger than 2 and e.g. 4, meaning that up to 4 copies of the same PDCP PDU of a radio bearer can be transmitted.

PDCP duplication over two or more legs may have the benefit of reducing the probability of packet errors, including having two consecutive packet transmission errors. However, PDCP duplication may also increase the carried traffic and thereby also increase interference due to the transmission of multiple copies of the same PDU over multiple legs. Limited time diversity can be exploited for the transmission of duplicates from different legs. Duplicates are generated by the PDCP layer and immediately sent to the lower layers for transmission. In some exemplary embodiments it may be possible that the performance of the legs (e.g. their signal level and/or signal quality) is correlated in time and therefore all links used for the transmission of the replica may suffer from low channel condition at the same time, for example, if the terminal device is at cell edge. This may lead to packet losses.

Time Sensitive Communications (TSC) are often used in industrial IoT scenarios for example in industrial automation. For example, motion control commands and/or feedback are transmitted as Ultra Reliable Low Latency Communications (URLLC) traffic to benefit of the mechanisms provided by 5G, such as those described in Rel.15 NR, for the protection and fast transmissions of communication over the radio, like for example prioritizing an URLLC transmission by puncturing an ongoing eMBB transmission implemented by a scheduler. The timeliness and correctness requirements of TSC may however require an additional layer of protection, prioritization and/or reliability. This may be, at least partly, because in several configurations (e.g., subcarrier spacing of 30 KHz or above) only 1 HARQ retransmission can be accommodated within the 1-ms delay budget of URLLC. Also, there may not be time to accommodate for RLC retransmissions (i.e., RLC unacknowledged mode is assumed for URLLC).

To mitigate the increase of carried load and interference, enhancements for improving the radio efficiency of PDCP duplication such as selective PDCP duplication and PDCP PDU dropping may be utilized. In these methods transmitting unnecessary PDCP-PDUs may be avoided, when a copy has been successfully received by relying on signalling between the gNB and the UE and/or between gNBs to inform the transmitting entity about the PDUs that have been correctly received.

To reduce the data packet losses, coding methods that combine multiple PDUs together, an identification mechanism to identify coded and encoded messages, a method to generate sequence numbers (SN) for coded messages and delete duplicates, decoding methods to recover original messages, and a signalling procedure to reset the coded duplication when the receiver has collected the original packets may be utilized.

According to an exemplary embodiment, there is a method comprising coding of two or more distinct data packets together and decoding of the data packets that were coded to recover the original data. The method may be used in combination with a data duplication scheme such as PDCP-layer duplication or higher layer duplication (i.e. above PDCP), which may increase reliability and resource efficiency. In following exemplary embodiments, a coding and decoding framework is provided in the context of PDCP duplication and is called PDCP Coded Duplication (PDCP-CD). It is to be noted that the coding and decoding framework may flexibly operate to increase reliability against two or more simultaneous transmission errors such as multiple legs failing at the same time, and/or to increase reliability against two or more consecutive transmission errors such as same leg failing across time.

The following exemplary embodiments further define an indication to a receiver to identify that the received data packet was coded, which original data packets formed such coded data packet and which, one or more, coding functions and parameters were used to form the coded data packet, thus enabling the corresponding decoding and recovery of the original data at the receiver. The receiver may be an apparatus such as a terminal device or an apparatus such as an access node. The indication (e.g. A and B) may be provided for instance dynamically within the data packet, in the form of a flag or an index embedded in the PDCP header, as a new IE using some of existing reserved bits. Some parts of this indication (e.g. C) may be static or semi-static and therefore may be pre-defined, for example by defining those in a specification, or configured via RRC signalling. Additionally, the method may include a procedure to progress a coded duplication transmitter window if the receiver has successfully received an original data packet. This way received data packets may be removed from the window to avoid using them in future coding process. Additionally, to further improve reliability against consecutive transmission errors, a Consecutive Errors Correction (CEC) scheme that dynamically determines either to code or duplicate data packets according to a notification of a successful reception of previous data packets may be utilized.

In some exemplary embodiments, it may be determined if at least two data packets are to be duplicated based on, at least partly, one or more of the following: a notification, a condition, or a first indication. The notification may comprise information regarding a packet loss and/or a packet timeout, the first indication may comprise a signal from another apparatus and the condition may comprise a Boolean clause.

In an exemplary embodiment, a PDCP layer at a transmitter, which may be comprised in an access node such as a gNodeB or an apparatus such as a terminal device, receives a sequence of distinct data packets from an upper layer such as an SDAP layer. Data packets comprised in the sequence of distinct data packets may then be stored for example in the PDCP buffer with the PDCP sequence number, SN, in the header indicating their order. In this exemplary embodiment the PDCP layer takes two or more data packets from the buffer P={p_0, p_1, ..., p_N}, as candidate packets to be coded, codes them together, by applying e.g. a bitwise function such as exclusive or, XOR, before delivering them on to one or more legs. A set of coding functions may be applied to P to generate new coded data packets P^c=F(P), and the size of an original packet, p_i, and of a coded packet, p_i^c, is equivalent, denoted as S (in bit). The coding functions may be implemented in a number of ways with different complexity and reliability delivery. One or more logical operations, such as exclusive or, may be applied to entire P or a subset of P, to generate one or more different coded data packet P^c with size S. The original data packet P and the coded data packet P^c are delivered to different legs, which may improve diversity. It is to be noted that some data packets may be lost due to radio failures on some legs. However, the receiver can recover a lost data packet by applying the corresponding decoding function to the received packets: F^(−1) (P, P^c). The decoding procedure may be regarded as the inverse operation of the coding procedure. The error probability of the PDCP-CD according to this exemplary embodiment may be lower than that of a PDCP duplication scheme, thus increasing reliability. This is because the receiver can recover an original data packet from the coded data packets, whereas in PDCP duplication scheme the lost packet may not be recoverable.

Figure 4:
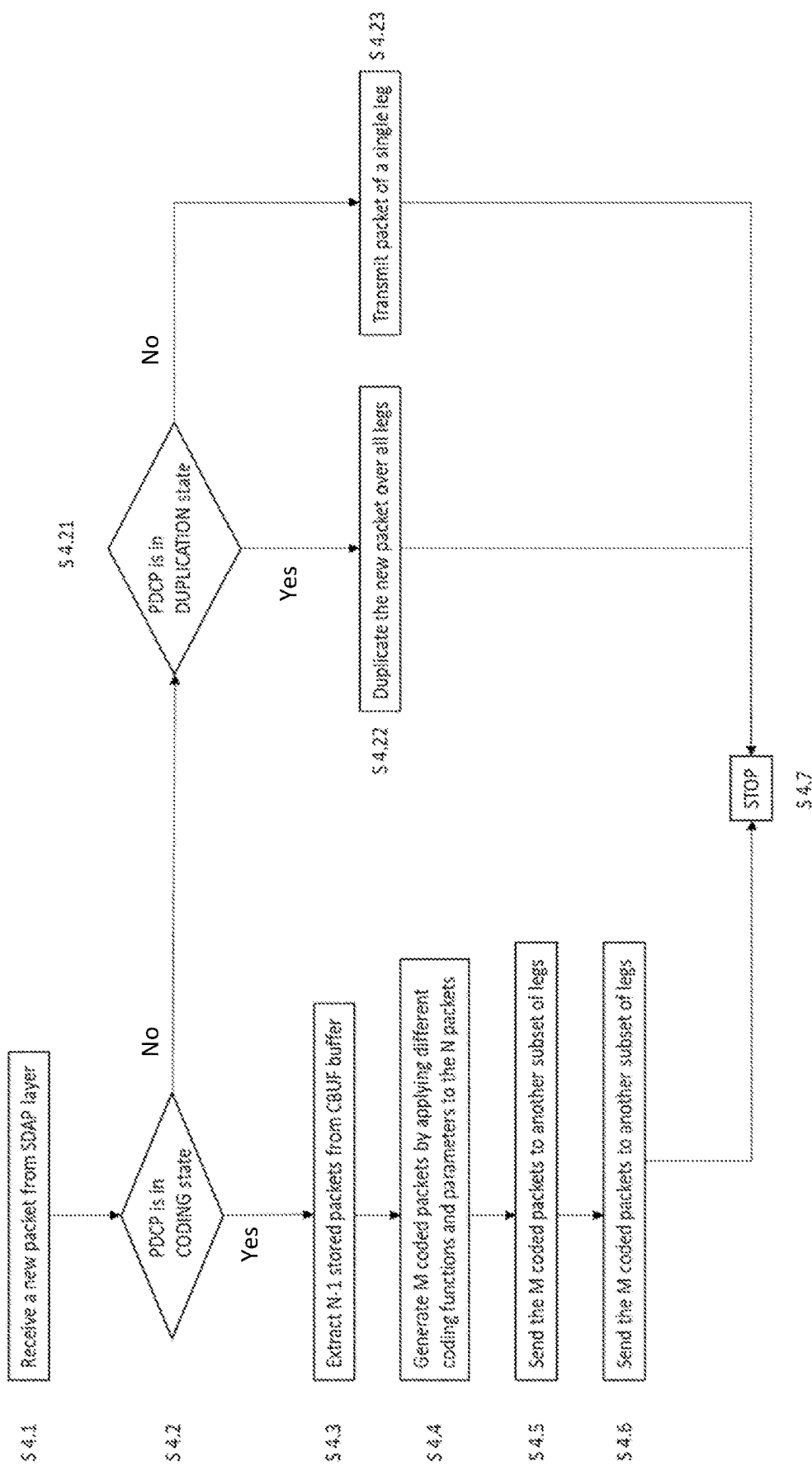
FIG. 4 illustrates a flow chart of an exemplary embodiment of a transmission phase with PDCP-CD.

FIG. 4 illustrates a flow chart according to an exemplary embodiment. In S 4.1 a data packet is received from an SDAP layer. After this, in S 4.2, it is determined if a PDCP is in a Coding state. If the PDCP is in a coding state, then N−1 data packets stored in a buffer, such as a coding buffer CBUF, may be extracted as illustrated in S 4.3. In some exemplary embodiments, more than one buffers could be used to store the N−1 data packets. N in this exemplary embodiment may indicate the number of the data packets received. Next in S 4.4 an M number of coded data packets may be generated by applying various coding functions and parameters to the N packets. Then in S 4.5 the N original data packets are transmitted to a subset of legs and in S 4.6 the M coded data packets are transmitted to another subset of legs after which the flow chart ends in 4.7.

If the PDCP on the other hand is not in Coding state, the flow chart proceeds from S 4.2 to S 4.21 in which it is determined if the PDCP is in Duplication state. If it is, then the exemplary embodiment of the flowchart proceeds to S 4.22 in which the data packet received is duplicated and transmitted to all legs. If on the other hand the PDCP is not in the Duplication state, the data packet is then transmitted to a single leg.

By introducing the Coding state to the PDCP coding operations are performed before transmitting the data packets to different legs. The coding operations may be executed as soon as a new data packet is received using if necessary previously received, in other words old, data packets stored in one or more internal buffers.

Figure 5:
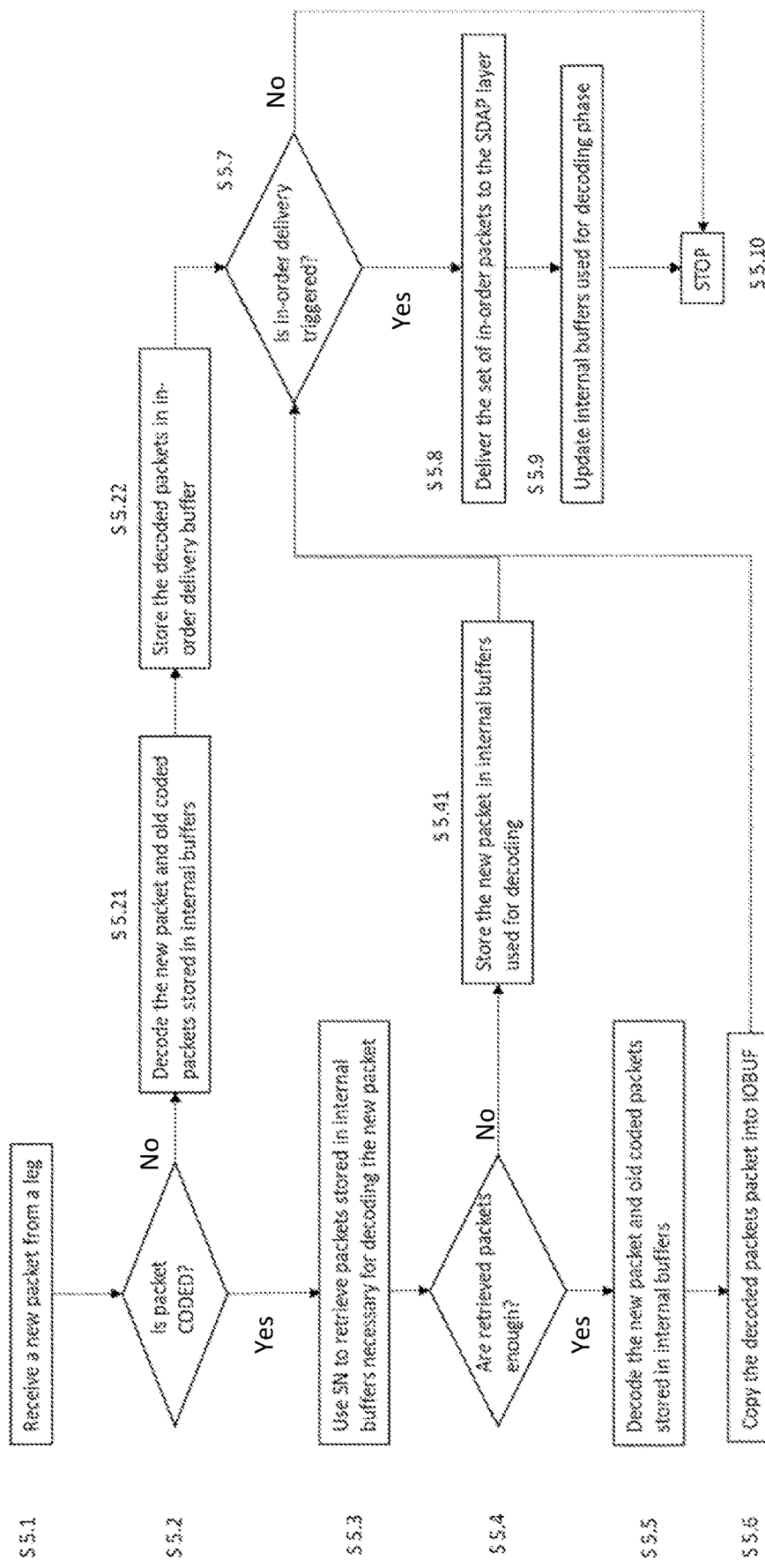
FIG. 5 illustrates a flow chart of an exemplary embodiment of a reception phase with PDCP-CD.

FIG. 5 illustrates another flow chart according to an exemplary embodiment. In S 5.1 a data packet is received from a leg. In S 5.2 it is determined if the data packet has been coded. If yes, then in S 5.3 the sequence number SN is used to retrieve data packets, that are stored in one or more internal buffers, needed for decoding the new data packet. If the data packet is not coded, then the data packet may be used to decode one or more previously received coded data packets that are stored in the one or more internal buffers as illustrated in S 5.21. Then all data packets that have been decoded in S 5.21 are stored in the one or more internal buffers that may comprise an in-order delivery buffer as illustrated in S 5.22 if in-order delivery to higher layers is needed.

In S 5.4 it is determined if the retrieved data packets are sufficient. If yes, then in S 5.5 the new data packet and previously received coded data packet stored in internal buffers are decoded. If not, the new data packet is stored in one or more internal buffers used for decoding as illustrated in S 5.41.

In S 5.6 the decoded packets are copied to a buffer such as in-order buffer, IOBUF, that may be comprised in the one or more internal buffers. In S 5.7 it is determined if in-order delivery is triggered. If yes, then in S5.8 a set of in-order packets are transmitted to the SDAP layer. If not, then the process ends. In S 5.9 the one or more internal buffers used for decoding are updated and after that the process ends.

It is to be noted that in some exemplary embodiments, the one or more internal buffers may store data packets until an event, such as an in-order delivery event has been triggered. The triggered event may be interpreted, in some exemplary embodiment, as meeting a discard condition. The discard condition may indicate the data packets stored in the one or more internal buffers are not to be stored anymore. The discard condition may be associated with an in-order delivery event that has been triggered or a packet discarding event.

In the exemplary embodiment of FIG. 5 an indication that a data packet was coded is sufficient for determining the next operations. A coded data packet may be decoded in the exemplary embodiment of FIG. 5 if enough data packets that were originally used to generate this data packet have been received. These data packets are stored in one or more internal buffers such as buffers similar to the in-order delivery buffer used in PDCP. The number of data packets needed depends on the coding function and its parameters, which are configured for example with an information element exchanged during the configuration of the legs. If the one or more internal buffers comprise enough data packets for decoding the received coded data packet, it may be determined that the one or more internal buffers comprise a minimum set of data packets for generating the coded data packet and this determination may be done using the sequence numbers assigned to the data packets.

In the following exemplary embodiments, a mechanism called Consecutive Errors Correction (CEC) scheme is further introduced. CEC scheme dynamically determines whether data packets are to be coded or duplicated according to a notification of successful reception of previous data packets. The CEC scheme works on top of the coding procedure by changing the PDCP state between CODING and DUPLICATION. The CEC scheme and the coding procedure are disclosed in more detail in the following exemplary embodiments.

Figure 6A:
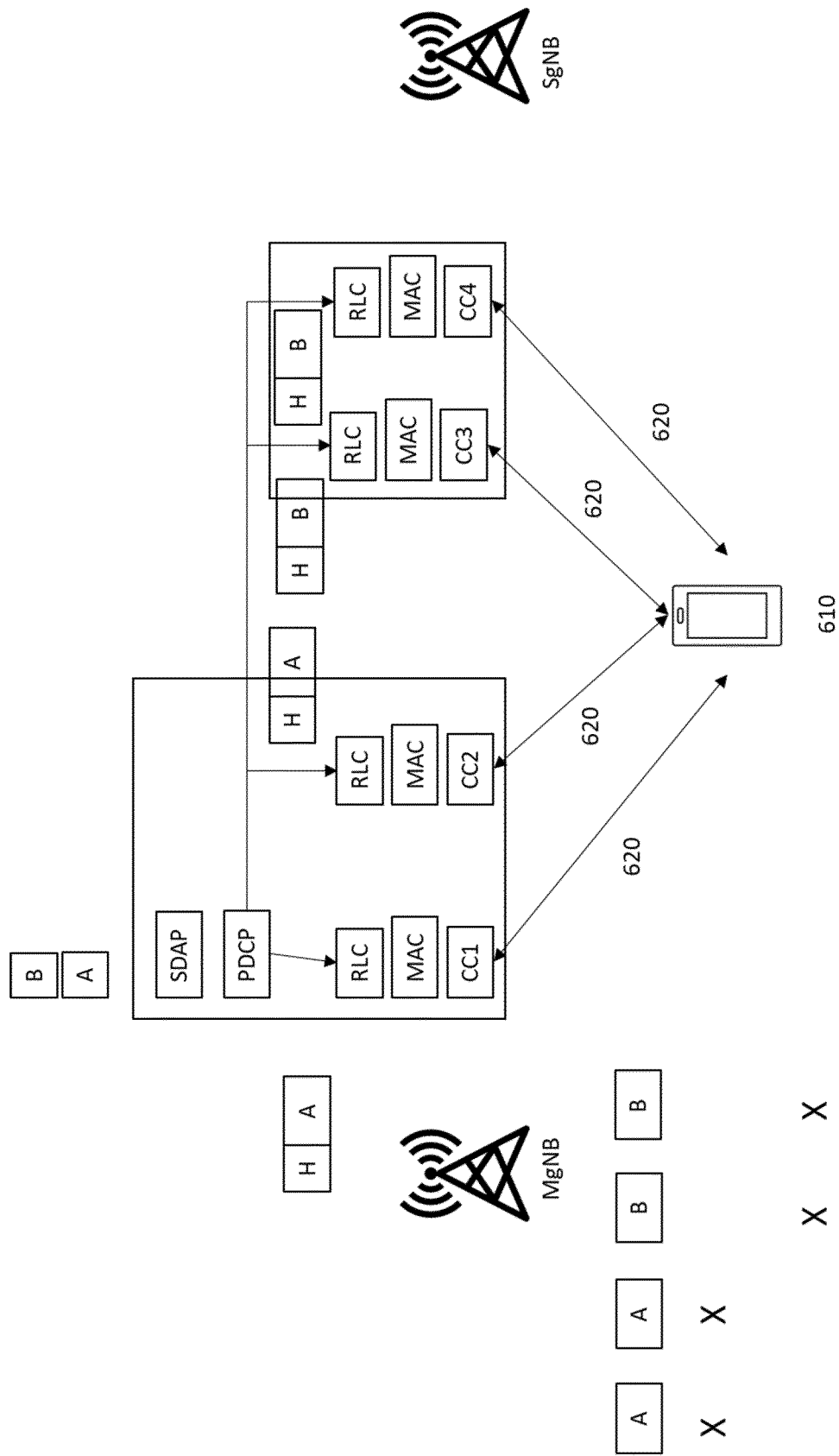
FIGS. 6a-6c illustrate exemplary embodiments of various PDCP implementations.

FIG. 6a illustrates an exemplary embodiment in which a terminal device 610 has two data packets, A and B, and four transmission legs 620. A sequence of crosses on the same line in the FIG. 6a illustrate a sequence of simultaneous transmission errors on the legs 620 that cause a loss of either A or B. It is to be noted that PDCP duplication illustrated in FIG. 6a is also affected by three consecutive errors. However, for the sake of brevity, only some of them are hereby illustrated in this exemplary embodiment. For successful transmission, two objectives may be defined.

Objective 1: A and B are received successfully.
Objective 2: at least A or B are received successfully (i.e. survival time=2 packets).

The following schemes are used in this exemplary embodiment. PDCP duplication with two legs is used to limit radio resource usage. The PDCP transmitter duplicates both A and B and sends the copies for transmission to two out of the four legs 620 that are available in this exemplary embodiment. In other words, one data packet per leg and four data packets in total.

In order to achieve objective 1, it is sufficient that at least one out of the 2 copies of A and B is received successfully at the PDCP receiver. To achieve objective 2, it is sufficient that at least one out of the 4 packets is received successfully at the PDCP receiver.

Figure 6B:
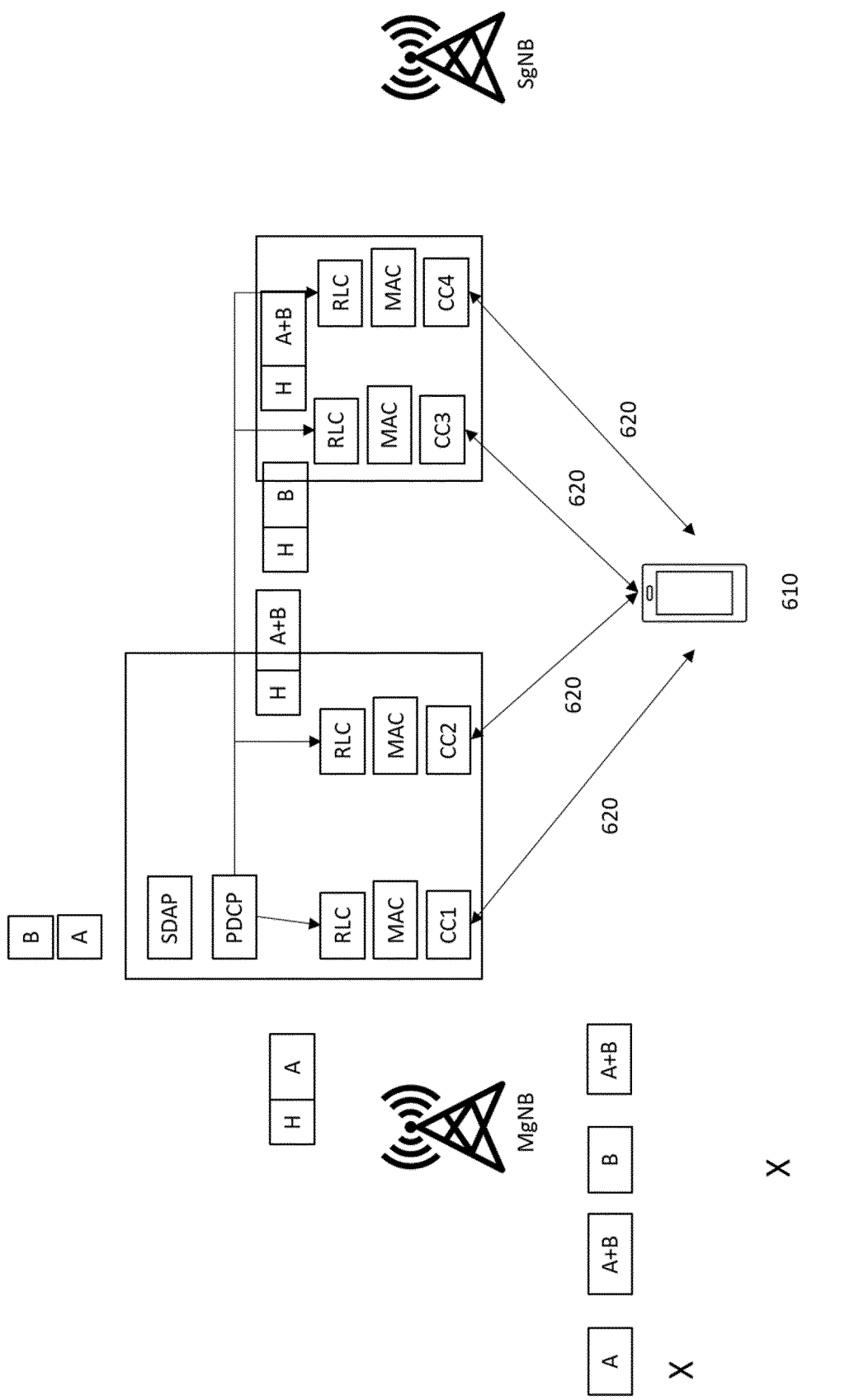

FIG. 6b on the other hand illustrates another exemplary embodiment in which the architecture and objectives correspond to that of the FIG. 6a. A network entity, which may be a MgNB, codes A and B generating 1 coded data packet, e.g. p_1^c=XOR(A,B) and sends A, p_1^c, B and p_1^c to the four legs 620 respectively for transmission. In other words, one data packet per leg and four data packets in total.

For objective 1 it is sufficient that at least one uncoded data packet, either A or B, and one coded data packet, p_1^c, are received successfully at the PDCP receiver or that both uncoded data packets A and B are received successfully at the PDCP receiver. For objective 2 it is sufficient that at least one uncoded data packet, either A or B, is received successfully at the PDCP receiver.

Figure 6C:
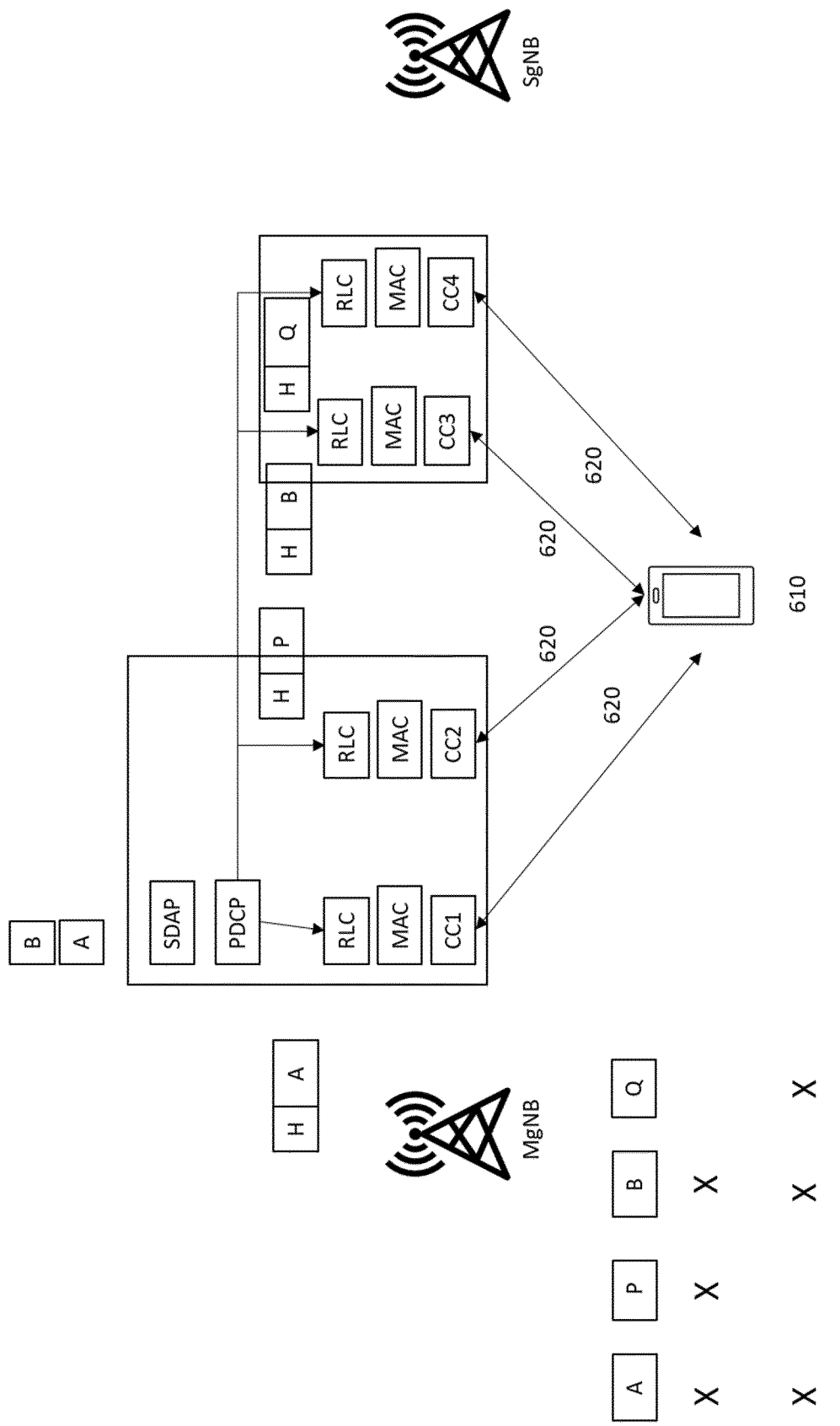

FIG. 6c illustrates a further exemplary embodiment with the same architecture and objectives as FIGS. 6a and 6b. In this exemplary embodiment, the data packets A and B are coded as P=F_1 (A,B) and Q=F_2 (A,B) by the PDCP transmitter, where the function F1 and F2 are e.g. designed using the Forward Error Correction, FEC, scheme that can withstand any two errors. FEC may comprise using at least one of the following operations: logical, Boolean, shift, concatenation and linear feedback shift register. Then data packets A, B, P and Q are delivered to the four legs 620, respectively. A benefit with this scheme is that there is a data packet error only if at least three simultaneous errors on three different legs occur, in other words, if any combination of three data packets is lost. To achieve objective 2 it is sufficient that at least any two data packets, either coded or uncoded, or any mix of the two types, are received successfully at the PDCP receiver. To achieve objective 2, it is therefore sufficient that at least one out of two original data packets, either A or B, is received successfully at the PDCP receiver or that the two coded data packets P and Q are received successfully at the PDCP receiver, which also meets objective 1.

It is to be noted that in the scheme illustrated in FIG. 6a, where data packets are simply duplicated, the error probability for Objective 1 doubles with respect to the scheme illustrated in FIG. 6b when two simultaneous leg errors occur. The coded scheme in FIG. 6c is even more reliable than the one in FIG. 6b since only three simultaneous transmission errors result in packet loss of either A or B. It is further to be noted that also the coding scheme may be different: it may be more robust to transmission errors, and flexible enough to cover multiple scenarios and coding methods, for example, more than four legs, coding over time, beyond over space. Furthermore, it is not required to wait for enough data packets to generate a coded data packet.

Below is a table 1 that introduces a set of parameters and their description. These parameters are used in the following exemplary embodiment.

TABLE 1

| Parameter | Description |
|---|---|
| L | Number of legs |
| K | Chunk size in bits |
| N ≤ L-2 | Number of original packets to encode together (called also coding depth) |
| G | Generator |
| SN | Sequence Number |
| S | Packet size in bits |
| T | Type of packet (0: uncoded, 1: first coded: 2: second coded). Two reserved bits of the PDCP header are considered for T |
| CBUF | Coding buffer. It is a FIFO that contains N-1 uncoded packets |
| DBUF | Decoding Buffer. It is a FIFO that contains coded packets |
| LBUF | Last in-order Buffer. It contains the N-1 packets with the largest SNs sent to the upper layer |
| IODBUF | In-Order Delivery Buffer. It contains a list of non-ordered PDCP PDUs. It is a sequence of PDCP PDUs with non-consecutive SNs |

PDCP-CD uses in this exemplary embodiment Forward Error Correction, FEC, scheme to generate two coded data packets from a set of N data packets received from the upper layer. The necessary parameters for the PDCP-CD scheme includes: the number of legs L (legs), the number of coded data packets N (depth), the chunk size in bits K (chunk), and the generator parameter G (generator). These parameters are then synchronized between the transmitter and receiver to align the coding and decoding function. An additional PDCP-Coding parameter sequence may be added to the existing PDCP-Config Information Element (IE), which is sent from a MgNB to a terminal device during establishment of secondary legs. An example of the PDCP-Config IE is defined in 3GPP TS 38.331. Additionally, the following IE may be introduced to enable PDCP-CD:

```
PDCP-Config ::= SEQUENCE {
  ......
  moreThanOneRLC SEQUENCE {
    ......
    pdcp-Duplication BOOLEAN
    pdcp-Coding                    SEQUENCE{
                            legs
```

-continued

```
INTEGER (1...)
                        depth
INTEGER (1...)
                        chunk
INTEGER (0...S)
                        generator
INTEGER (1...)
                        },
......
```

The parameters of this exemplary embodiment may be adjusted according to the changes of leg channel quality, coding complexity, reliability requirement, buffer size, etc. Additionally, there may be some special cases of the parameters:
1) the coding scheme is disabled when legs=1 or depth=1;
2) the full data packet is not divided when applied to coding function when chunk=S;
3) the coefficients applied to all data packets are 1 when generator=1.

Figure 7:
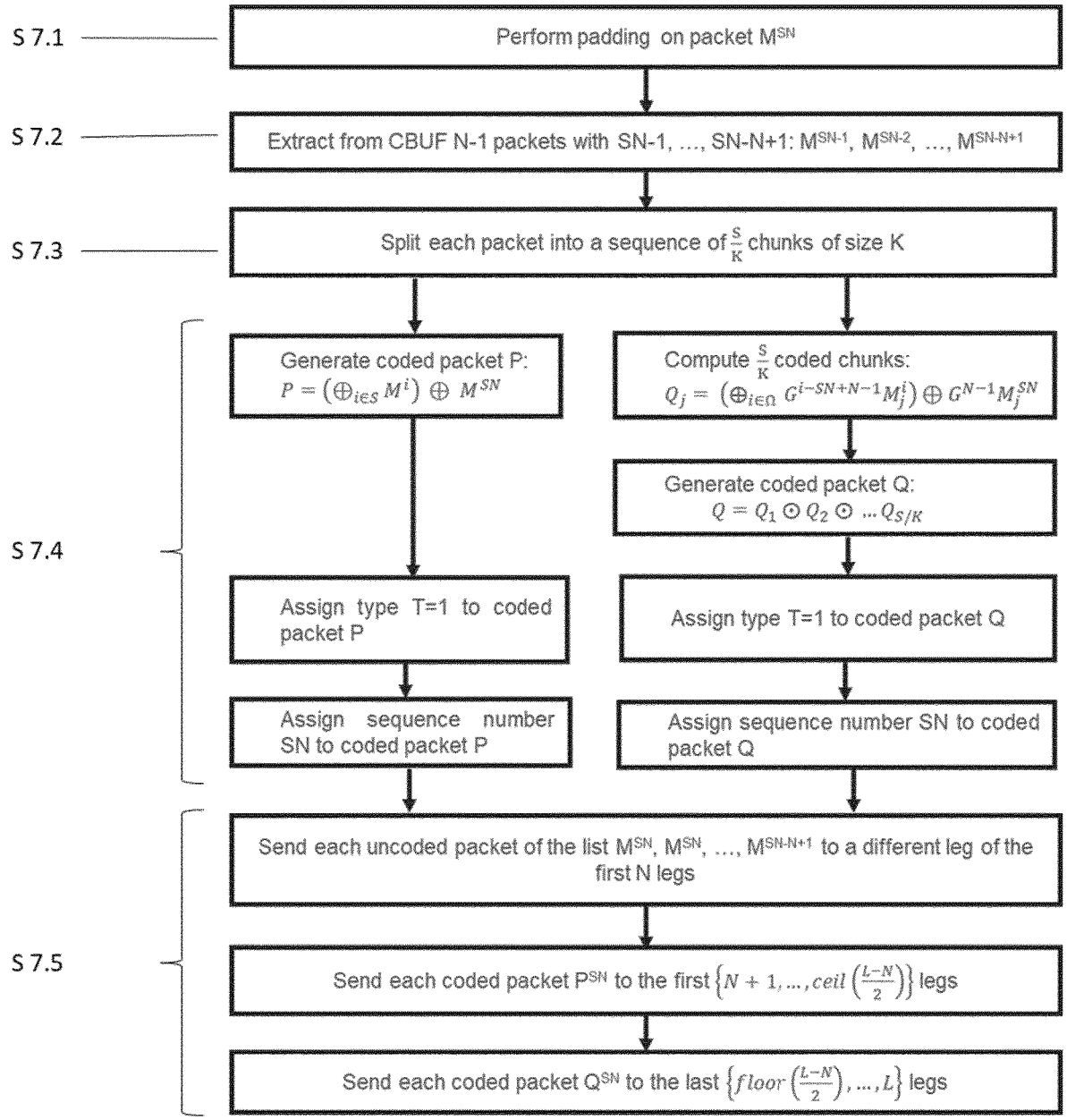
FIG. 7 illustrates an exemplary embodiment of transmission with coded duplication performed by PDCP-CD with FEC coding scheme.

Next, it is described how to generate coded PDCP PDUs from original PDCP SDUs received from the upper layer according to this exemplary embodiment. The parameters used are known to the gNB and the terminal device by any suitable means. In the implementation of PDCP-CD in this exemplary embodiment the Forward Error Correction, FEC, scheme is used to generate two coded data packets from N uncoded data packets. The flowchart of the coding mechanism is illustrated in FIG. 7.

In S 7.1 the N uncoded data packets with consecutive sequence numbers, SNs, are divided into chunks of size K. The j-th chunk of the i-th uncoded data packet is identified by $M_j^i$. One data packet is extracted from the queue of data packets received from the upper layer and is assigned a sequence number SN, whereas N−1 data packets are stored into CBUF and correspond to previous data packets in the sequence with sequence numbers in the set Ω={SN−1, SN−2, SN−N+1} as illustrated by S 7.2. Additionally, a padding operation may optionally be performed to make all data packets of the same size and multiple of K. It is to be noted that data packets in CBUF can be stored with the maximum length and the size of a new data packet may be matched by ignoring the extra bits. After this operation, all N data packets are of size S that may be represented as N collections of $$\frac{S}{K}$$

chunks of size K as illustrated in S 7.3.

In S 7.4 two coded data packets are generated using the FEC code. The first coded data packet P may be obtained as a summation in GF($2^K$) of the N−1 original data packets whose SN are in the set Ω and the N-th data packet with SN as follows:

$$P = (\bigoplus_{i \in \Omega} M^i) \oplus M^{SN}$$

The second coded data packet may be generated as the concatenation $$\frac{S}{K}$$

of coded chunks. Each coded chunk may be obtained as a linear combination in GF($2^K$) of N chunks from the original data packets. For example, the j-th coded chunk $Q_j$ can be computed as follows:

$$Q_j = \left(\bigoplus_{i \in \Omega} G^{i-SN+N-1} M_j^i\right) \oplus G^{N-1} M_j^{SN} =$$
$$G^0 M_j^{SN-N+1} \oplus G^1 M_j^{SN-N+2} \oplus G^{i-SN+N-1} M_j^i \oplus \ldots \oplus G^{N-1} M_j^{SN}$$

where G is the generator of the GF($2^K$) signalled using RRC. Then, the second coded data packet Q may be obtained by concatenating the $$\frac{S}{K}$$

coded chunks as follows:

$$Q = Q_1 \odot Q_2 \odot Q_{S/K}$$

Once the two coded data packets are generated, the next step assigns the highest sequence number across the uncoded packets $M_i$ to coded data packets P and Q and assign the type T=1 to the coded data packet P and T=2 to the coded data packet Q.

The last step consists in replacing the oldest packet in CBUF, which may be the one with the smaller SN, is replaced with the one extracted from the queue. This can be implemented for example with a simple FIFO queue of size N−1. It is to be noted that at the beginning the FIFO queue may be initialized with N−1 dummy packets composed of all zeros.

In S 7.5 the N original data packets are sent to the first N out of L legs, whereas the coded data packet P is sent to the first $$\text{ceil}\left(\frac{L-N}{2}\right)$$

remaining legs and coded data packet Q to the last $$\text{floor}\left(\frac{L-N}{2}\right)$$

remaining legs.

In this exemplary embodiment the maximum depth N is related to the value of K, since N≤$2^K$−1. For example, if K=8 (i.e., chunk size equal to 8 bit), more than 255 uncoded data packets cannot be combined. However, it should be noted that as long as K≥ceil($\log_2$(L−1)) the limiting factor will be the number of legs L (i.e., N depends only on L according to N≤L−2).

Next, decoding of PDCP PDUs according to this exemplary in presence of consecutive transmission errors across the legs are discussed. The implementation according to this exemplary embodiment may recover any two consecutive transmission errors occurring over any two legs. When a new PDPC packet arrives from a leg, the type of the data packet T is determined:
   a. If the received data packet is a coded data packet of type P (T=1), its sequence number extracted from the header, such as $SN_P$, is used to look for i. N−1 distinct uncoded data packets with any sequence number in the set $\Omega=\{SN_P, SN_P-1, SN_P-2, \ldots, SN_P-N+1\}$ into the LBUF. Note that $\Omega$ has carnality N, but we assume that we have only any combination of N−1 distinct uncoded data packets into LBUF;

ii. N−2 distinct uncoded data packets with any sequence number in the set $\Omega=\{SN_P, SN_P-1, SN_P-2, \ldots, SN_P-N+1\}$ and 1 coded data packet of type Q (T=2) with sequence number equal to $SN_P$ into the DBUF;

b. If the received data packet is a coded data packet of type Q (T=2), its sequence number extracted from the header, such as $SN_Q$, is used to look for i. N−1 distinct uncoded data packets with any sequence number in the set $\Omega\Omega=\{SN_Q, SN_Q-1, SN_Q-2, \ldots, SN_Q-N+1\}$ in the LBUF;

ii. N−2 distinct uncoded data packets with any sequence number in the set $\Omega=\{SN_Q, SN_Q-1, SN_Q-2, \ldots, SN_Q-N+1\}$ and 1 coded data packet of type P (T=1) with sequence number equal to $SN_P$ into the DBUF;

c. If the received data packet is uncoded (T=0), its sequence number extracted from the header, such as $SN_X$, is used to look for i. N−2 distinct uncoded data packets with any sequence number in the set $\Omega=\{SN_X-1, SN_X-2, \ldots, SN_X-N+1\}$ (i.e., uncoded data packets with lower SN) into LBUF, and 1 coded data packet of type P (T=1) with sequence number equal to $SN_X$ into the DBUF;

ii. N−2 distinct uncoded data packets with any sequence number in the set $\Omega=\{SN_X-1, SN_X-2, \ldots, SN_X-N+1\}$ (i.e., uncoded data packets with lower SN) into LBUF, and 1 coded data packet of type Q (T=2) with sequence number equal to $SN_X$ into the DBUF;

iii. N−3 distinct uncoded data packets with any sequence number in the set $\Omega=\{SN_X-1, SN_X-2, \ldots, SN_X-N+1\}$ (i.e., uncoded data packets with lower SN) into LBUF, 1 coded data packet of type P (T=1) with sequence number equal to $SN_X$ into the DBUF, and 1 coded data packet of type Q (T=2) with sequence number equal to $SN_X$ into the DBUF;

If none of the cases (a.i) and (a.ii) are verified due to for example missing messages either in LBUF or DBUF, the received coded data packet may be stored in DBUF. Otherwise:

in case (a.i) is verified the PDCP entity can decode the data packet with the missing SN in the set $\Omega$, such as $M^u$, by combining with XOR the N−1 distinct uncoded data packets and the P data packet as follows: $M^u = (\oplus_{i \in \Omega} M^i) \oplus P$.

in case (a.ii) is verified, the PDCP entity can decode the two missing data packets $M^u$ and $M^v$, that are the ones with missing SN in the set $\Omega$ in a following manner: Compute $P^{uv} = (\oplus_{k \in \Omega \setminus u \setminus v} M^k)$ and chop it into chunks of size K. The j-th chunk is identified as $P_j^{uv}$ Split the data packets N−2 distinct uncoded data packets into chunks of size K. Optionally, perform padding to make all packets of the same size and multiple of K. After this operation there are $$(N-2)\frac{S}{K}$$

distinct chunks.

Combine the j-th chunk of all N−2 packets as follow $Q_j^{uv} = (\oplus_{k \in \Omega \setminus u \setminus v} G^{k-SN_P+N-1} M_j^k)$. Execute this operation for all $$\frac{S}{K}$$

collections of N−2 chunks.
Comput $$F_1 = \frac{G^{u-v}}{G^{u-v}+I} \text{ and } F_2 = \frac{G^{-(u-SN_P+N-1)}}{G^{u-v}+I},$$

where I is the identity element of the multiplication in $GF(2^K)$.

Recover the missing data packet $M^u$ as follows:
Compute the j-th chunk of $M^u$ as $M_j^u = F_1 \cdot (P_j \oplus P_j^{uv}) \oplus F_2 \cdot (Q \oplus Q_{uv})$, where $P_j$ is the j-th chunk of the coded data packet P.
Concatenate all chunks to recover the data packet $M^u = \odot_{i=1}^{S/K} M_j^u$ Recover the missing data packet $M^v$ as follows:
Compute $M^v = (P \oplus P^{uv}) \oplus M^u$ If none of the cases (b.i) and (b.ii) are verified for example due to missing messages either in LBUF or DBUF, the received coded data packet may be stored in DBUF. Otherwise:

in case (b.i) is verified the PDCP entity can decode the data packet with the missing SN in the set $\Omega$, such as $M^u$, as follows:

Split the packets N−1 distinct uncoded data packets into chunks of size K. Perform padding if necessary to make all data packets of the same size and multiple of K. After this operation there are $$(N-2)\frac{S}{K}$$

distinct chunks.
Combine the j-th chunk of all N−1 data packets as follow $Q_j^u = (\oplus_{k \in \Omega \setminus u} G^{k-SN_P n-1} M_j^k)$. Execute this operation for all $$\frac{S}{K}$$

collections of N−1 chunks.
Recover the missing data packet $M^u$ as follows:
Compute the j-th chunk of $M^u$ as $M_j^u = (Q_j \oplus Q_j^u) \cdot G^{-(u-SN_P+N-1)}$, where $Q_j$ is the j-th chunk of the coded data packet Q.
Concatenate all chunks to recover the data packet $M^u = \odot_{i=1}^{S/K} M_j^u$ In case (b.ii) is verified, the PDCP entity can decode the two missing data packets $M^u$ and $M^v$ as described for case (a.ii).

If none of the cases (c.i), (c.ii), and (c.iii) are verified for example due to missing messages either in LBUF or DBUF, the received coded data packet may be stored in DBUF. Otherwise:

In case (c.i) is verified, the PDCP entity can decode the data packet with the missing SN in the set $\Omega$, such as M″, as for the case (a.i), since after receiving $SN_X$ there are N−1 distinct uncoded data packets in LBUF and 1 coded data packet of type P with $SN=SN_X$ into DBUF.

in case (c.ii) is verified, the PDCP entity can decode the data packet with the missing SN in the set Ω, such as M″, as for the case (b.i), since after receiving $SN_X$ there are N−1 distinct uncoded data packets in LBUF and 1 coded data packet of type Q with $SN=SN_X$ into DBUF.

in case (c.iii) is verified, the PDCP entity can decode the data packet with the missing SN in the set Ω, such as M″, as for the case (a.ii), since after receiving $SN_X$ there are N−2 distinct uncoded data packets in LBUF, 1 coded data packet of type P with $SN=SN_X$ and 1 coded data packet of type T with $SN=SN_X$ into DBUF.

After the decoding step, the uncoded data packets received from any leg or decoded from DBUF are copied into an IODBUF buffer. This buffer may be used to implement the In-Order Delivery according to what is defined in 3 GPP TS 36.323.

If the In-Order Delivery of O PDCP PDUs is triggered, these O PDUs replace the oldest PDUs from the LBUF. In other words, the PDUs with the O smallest SNs are replaced with these new received or decoded O PDUs. This replacement step may be implemented for example if the LBUF is implemented as a FIFO queue.

For each PDCP PDU (either coded or not) a timer may be activated according to what is described in 3GPP R15 (TS 36.323) standard to avoid waiting indefinitely for lost PDUs. Therefore, when a timer is triggered the corresponding PDU is declared lost and the In-Order Delivery is executed. When the In-Order Delivery is triggered, the corresponding PDUs are also removed from IODBUF.

Figure 8:
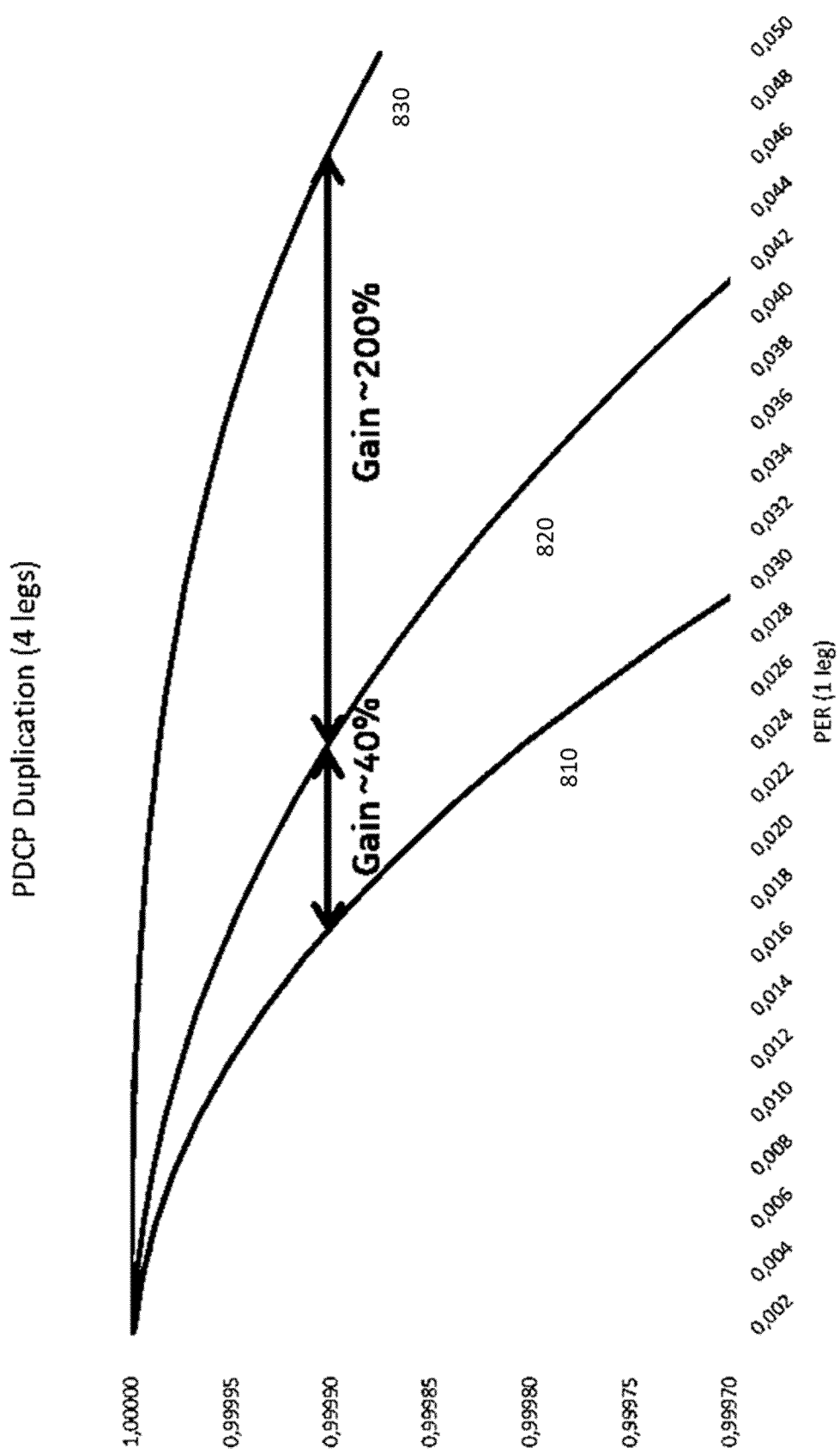

The disclosed PDCP-CD may increase the transmission reliability against two simultaneous or consecutive transmission errors occurring on two different legs, which may be beneficial for example in industrial/factory automation where two consecutive data packets errors might cause huge damages. FIG. 8 illustrates a data packet reception probability, which may be either downlink or uplink as a function of the packet error probability of one leg. In FIG. 8 it is considered that L=4 legs and independent packet losses on the different legs are assumed. The coding depth is 2 (N=2) and K=8. The following PDCP schemes are considered in FIG. 8:

A PDCP duplication according to 3GPPP R15, 810
PDCP-CD using FEC with N=2, L=4, K=8 and a generator of $GF(2^8)$ like G=0x02, 820.
PDCP-CD which replicates P twice, namely $Q=P=M^1 \oplus M^2$ (only XOR operations). This can be obtained by simply setting G=1. The curve is identified by the label 830.

It is to be noted that the configuration corresponds to those illustrated in FIGS. 6a-c, in which a sequence of crosses on the same line illustrated the sequence of simultaneous transmission errors that affect the reception of packets A and B.

FIG. 8 further illustrates reliability of the three considered schemes, where the reliability is defined as the probability of receiving both data packets within a transmission opportunity corresponding to objective 1 as discussed above. It is to be noted that the transmission opportunity may also be called as a transmission time. It may be observed that in the result 830 the reliability increases against simultaneous transmission errors on multiple legs. Further, PDCP-CD-FEC may be unable to recover some of the original messages only when three or four transmission errors occur, whereas transmission errors affecting two out of four legs have no impact on the reception of the original messages for PDCP-CD-FEC. It may also be observed that the XOR version of PDCP-CD outperforms the PDCP duplication. Indeed, the reception capability of PDCP-CD-XOR is affected by a lower number of legs failures than PDCP duplication 810.

Table 2 below provides the maximum packet error probability of one leg that a PDCP duplication mechanism can withstand to achieve the target reliability. At the target reliability of 4 nines PDCP-CD-FEC can withstand a number of packet transmission errors on any legs 2.5 times larger than the 3GPPP R15 version of PDCP duplication. Also, the simpler version PDCP-CD-XOR shows a gain of 40% with respect to the legacy version.

TABLE 2

| Target Reliability | 3GPPP R15 | XOR | FEC |
|---|---|---|---|
| 0.9999 | 0.016 | 0.024 | 0.047 |
| 0.999 | 0.051 | 0.072 | 0.1 |

In addition to the spatial domain reliability, PDCP-CD scheme may also enhance the reliability in time domain. This may be achieved by duplicating and coding some data packets sent in the last time frame. For example, the data packets sent on two consecutive time slots $t_0$ and $t_1$ can be: $\{x_0, x_1, F(x_0, x_1)\}$ and $\{x_1, x_2, F(x_1, x_2)\}$. This will allow the receiver to recover $x_1$ in case it is not delivered in $t_0$. The traffic and delay are increased compared to transmitting $\{x_2, x_3, F(x_2, x_3)\}$ in $t_1$. However, it is still more efficient than the legacy scheme transmitting multiple copies of $x_0$ and $x_1$ in $t_0$ and $t_1$, with higher reliability.

In an exemplary embodiment, the receiver uses the decoding scheme indicated by the legs-depth-coefficient parameters to decode the coded data packets. The receiver then signals the acknowledgement to transmitter on the SN of the packets that have been successfully decoded. The transmitter then removes the packets with indicated SN in buffer and applies coding to the other data packets. An example procedure is illustrated as follows.

| | Tx buffer | Rx ACK | Events |
|---|---|---|---|
| $t_0$ | $x_0, x_1, F(x_0, x_1)$ | 0 | $x_1$ is lost |
| $t_1$ | $x_1, x_2, F(x_1, x_2)$ | 1, 2 | $x_1, x_2$ is delivered |
| $t_2$ | $x_3, x_4, F(x_3, x_4)$ | 3, 4 | $x_2$ removed from coding |

Next, exemplary embodiments of a method called Consecutive Errors Corrections (CEC) scheme that dynamically decide whether to code data packets and/or changing coding scheme to increase the reliability in the time domain are discussed. Such an extension permits to improve reliability in spite of consecutive transmission errors. Once a packet error is detected, it is then beneficial to prioritize successfulness of subsequent transmission as shown for example in table 3 below. A network entity such as an access node or a terminal device may have preconfigured UL or DL allocations, such as semi-persistent scheduling, grant-free, configured scheduling, for multiple legs that occur according to URLLC traffic periodicity.

While the coding procedure described above increases the overall reliability, the repetition of multiple consecutive errors may negatively affect the application survival time constraints. The example of table 3, in which the transmission error of leg 2 at time 2 after transmission errors of both legs occurring at time 1 would result in the loss of data packet C. In this case, as depicted in table 3, avoiding the coding procedure and switching to the classical duplication at time 2 is beneficial for the reception of packet C and avoiding consecutive errors as packet B was not successfully received.

Therefore, a Consecutive Errors Correction (CEC) method that modifies the coding scheme over multiple transmission occasions after the first error is detected may be beneficial.

TABLE 3

| Time | Leg1 | Leg2 | explanation |
|---|---|---|---|
| 0 | B | B⊕A | Transmit latest packet B over one leg and copy of it that is coded with previous packet A |
| 1 | C | C⊕B | Decoding of C and B is failed |
| 2 | C | C | To prevent consecutive errors, omit coding and transmit packet C over multiple legs without coding |
| 3 | E | E⊕D | After successful reception coding with previous packet is again applied. Also, packet D can be still decoded successfully if packet E is decoded as well. |

Figure 9:
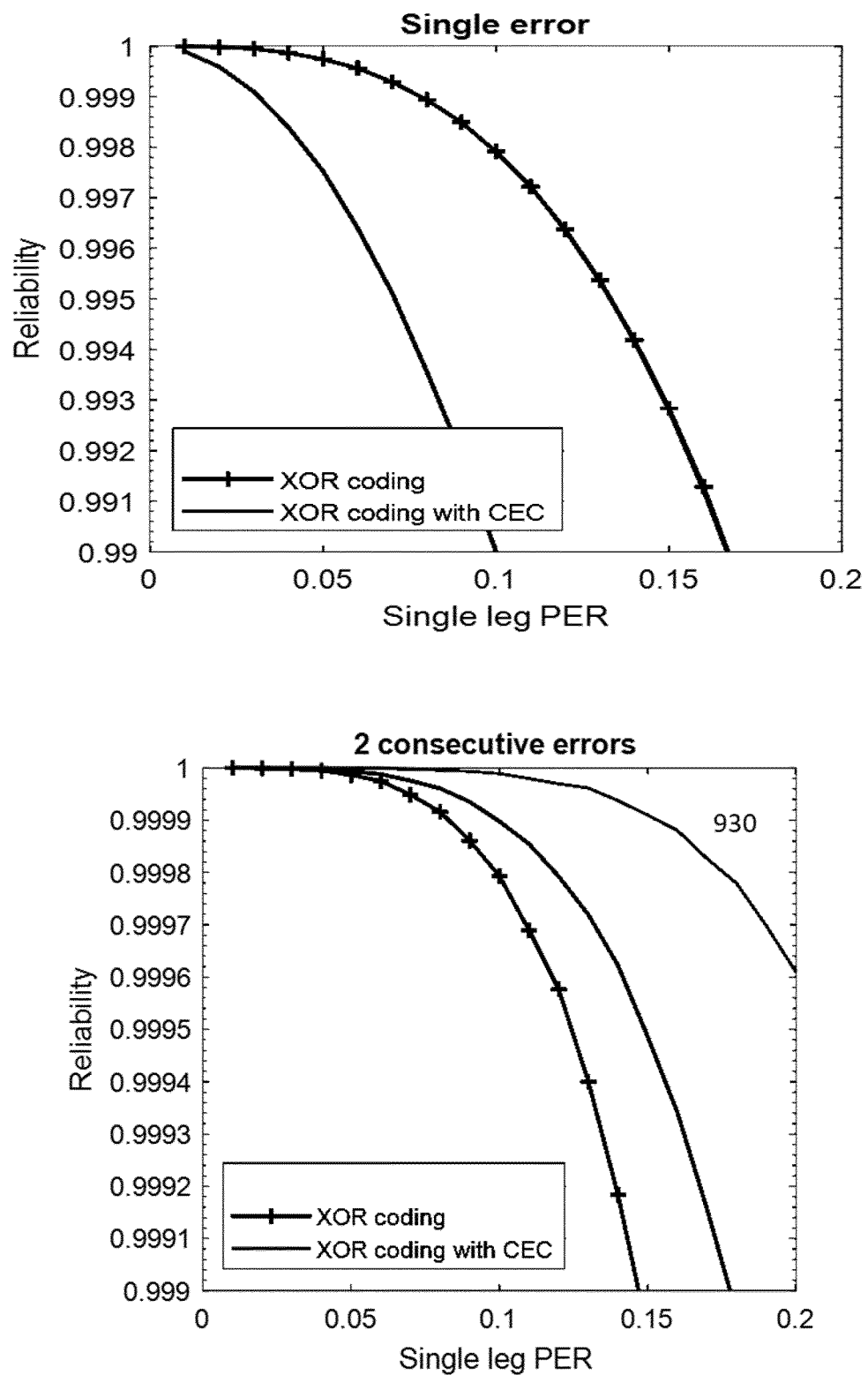

The CEC scheme above was compared against the static PDCP duplication and PDCP-CD in a scenario with two legs. For PDCP-CD an XOR operation between the current and previous data packets to generate the coded data packet may be considered. The uncoded data packet is sent over the first leg whereas the coded data packet over the second legs as illustrated in Table 3. As illustrated in FIG. 9, PDCP-CD-XOR improves the reliability against a single leg error. However, the number of 2 consecutive errors increases since the successful reception of a data packet at given time depends on the success of previous transmissions. If a leg fails at a given time after two legs both legs failed in the previous time, then the data packet is lost. If PDCP-CD can react to unsuccessful transmissions as is the case with CEC method, then both single error reliability and probability of consecutive errors can be improved significantly without increasing radio resource usage as shown by the curve 930 in the FIG. 9.

FIG. 10 illustrates how probability of two consecutive errors becomes negligible with four transmission legs when proposed coding, simple XOR in this example, is utilized together with the CEC method. A single data packet is sent over two legs without coding and over remaining two legs with coding. If similar event as depicted in time instant 1 of Table 3 occurs, then in time instant 2 data packet C is transmitted without coding over all 4 transmission legs.

It should be noted that in results previously shown it was assumed that data packet is lost if it cannot be decoded after 2 consecutive transmission time occasions. This may be considered as a realistic assumption since URLLC packets tend to have short delay constraints and survival time is defined in 3GPP TS 22.804 as "the time that an application consuming a communication service may continue without an anticipated message" and for URLLC applications identified in 3GPP TS 22.804 survival time is usually assumed to be the same as transfer interval target or in some cases bit more than that.

The CEC scheme may also be combined with FEC coding of consecutive data packets. An example is given in Table 4 with 3 transmission legs. It is to be noted that the same applies also for more than 3 transmission legs cases and numerous different combinations of coded and uncoded transmissions can be formed over plurality of transmission legs. In this example one transmission leg transmits original data packet and the other 2 transmission legs transmit versions P and Q that are obtained by coding the current data packet with the data packet transmitted in the previous transmission time. It is to be noted that transmission time may also be referred to as a transmission opportunity. In XOR example two legs transmit uncoded data packet and one leg coded data packet. If error occurs as illustrated in time instance 1 of Table 4, then latest data packet is transmitted over multiple legs during the next time instance.

TABLE 4

| Time | Coding scheme | Leg1 | Leg2 | leg3 | Explanation |
|---|---|---|---|---|---|
| 0 | XOR | B | B⊕A | B | Transmit latest packet B over one leg and copy of it that is coded with previous packet A |
|   | FEC | B | P(B⊕A) | Q(B⊕A) | |
| 1 | XOR | C | C⊕B | C | Decoding of C and B is failed |
|   | FEC | C | P(C⊕B) | Q(C⊕B) | |
| 2 | XOR | C | C | C | To prevent consecutive errors, omit coding and transmit packet C over multiple legs without coding |
|   | FEC | C | C | C | |
| 3 | XOR | E | E⊕D | E | After successful reception coding with previous packet is again applied. Also, packet D can be still decoded successfully if packet E is decoded as well. |
|   | FEC | E | P(E⊕D) | Q(E⊕D) | |

Numerical results of the proposed data packet duplication coding schemes with and without the CEC method are provided in FIG. 11. For comparison, also performance of a solution in which each data packet is duplicated over all transmission legs is shown. All schemes utilize the same amount of radio resources. It may be observed that the CEC method coupled with the coded data packet duplication outperforms in both single packet reliability and in reliability where two consecutive errors count as failure.

Figure 12:
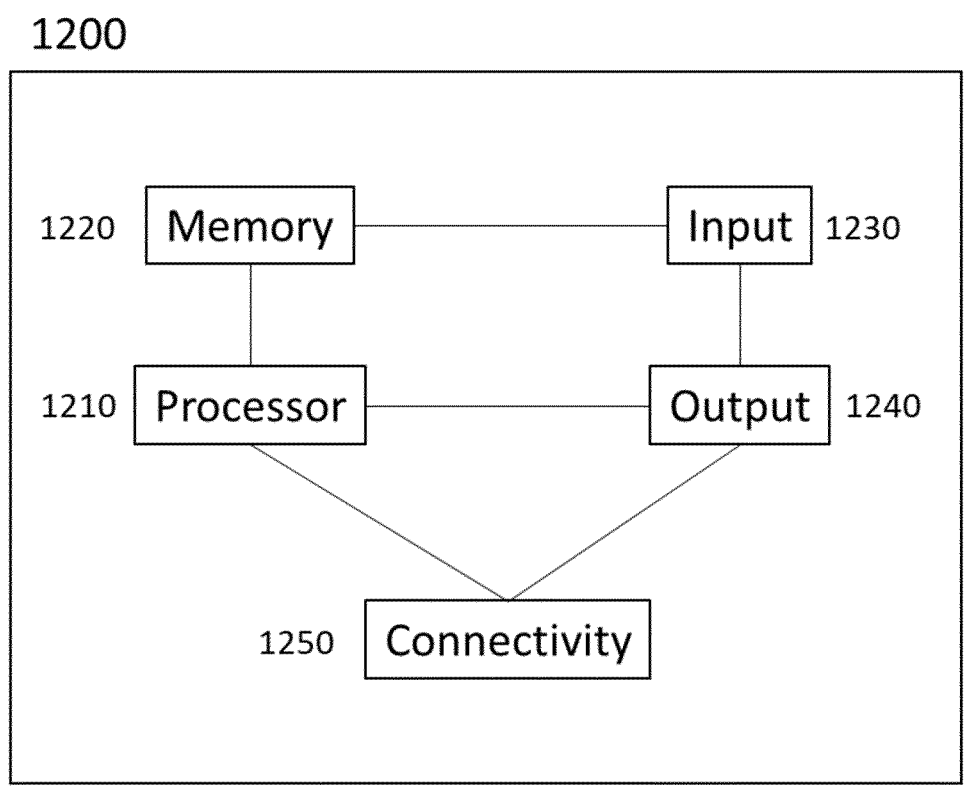
FIGS. 12 and 13 illustrate apparatuses according to exemplary embodiments.

FIG. 12 illustrates an apparatus 1200, which may be an apparatus such as, or comprised in, a terminal device, according to an example embodiment. The apparatus 1200 comprises a processor 1210. The processor 1210 interprets computer program instructions and processes data. The processor 1210 may comprise one or more programmable processors. The processor 1210 may comprise programmable hardware with embedded firmware and may, alternatively or additionally, comprise one or more application specific integrated circuits, ASICs.

The processor 1210 is coupled to a memory 1220. The processor is configured to read and write data to and from the memory 1220. The memory 1220 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1220 stores computer readable instructions that are execute by the processor 1210. For example, non-volatile memory stores the computer readable instructions and the processor 1210 executes the instructions using volatile memory for temporary storage of data and/or instructions.

The computer readable instructions may have been pre-stored to the memory 1220 or, alternatively or additionally, they may be received, by the apparatus, via electromagnetic carrier signal and/or may be copied from a physical entity such as computer program product. Execution of the computer readable instructions causes the apparatus 1200 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 1200 further comprises, or is connected to, an input unit 1230. The input unit 1230 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 1230 may comprise an interface to which external devices may connect to.

The apparatus 1200 also comprises an output unit 1240. The output unit comprises or is connected to one or more displays capable of rendering visual content such as a light emitting diode, LED, display, a liquid crystal display, LCD and a liquid crystal on silicon, LCoS, display. The output unit 1240 may comprise two displays to render stereoscopic visual content. One display to render content to the left eye and the other display to render content to the right eye. The output unit 1240 may further comprise a transmission unit, such as one or more waveguides or one or more lenses, to transfer the rendered visual content to the user's field of view. The output unit 1240 further comprises one or more audio outputs. The one or more audio outputs may be for example loudspeakers or a set of headphones.

The apparatus 1200 may further comprise a connectivity unit 1250. The connectivity unit 1250 enables wired and/or wireless connectivity to external networks. The connectivity unit 1250 may comprise one or more antennas and one or more receivers that may be integrated to the apparatus 1200 or the apparatus 1200 may be connected to. The connectivity unit 1250 may comprise an integrated circuit or a set of integrated circuits that provide the wireless communication capability for the apparatus 1200. Alternatively, the wireless connectivity may be a hardwired application specific integrated circuit, ASIC.

It is to be noted that the apparatus 1200 may further comprise various component not illustrated in the FIG. 12. The various components may be hardware component and/or software components.

Figure 13:
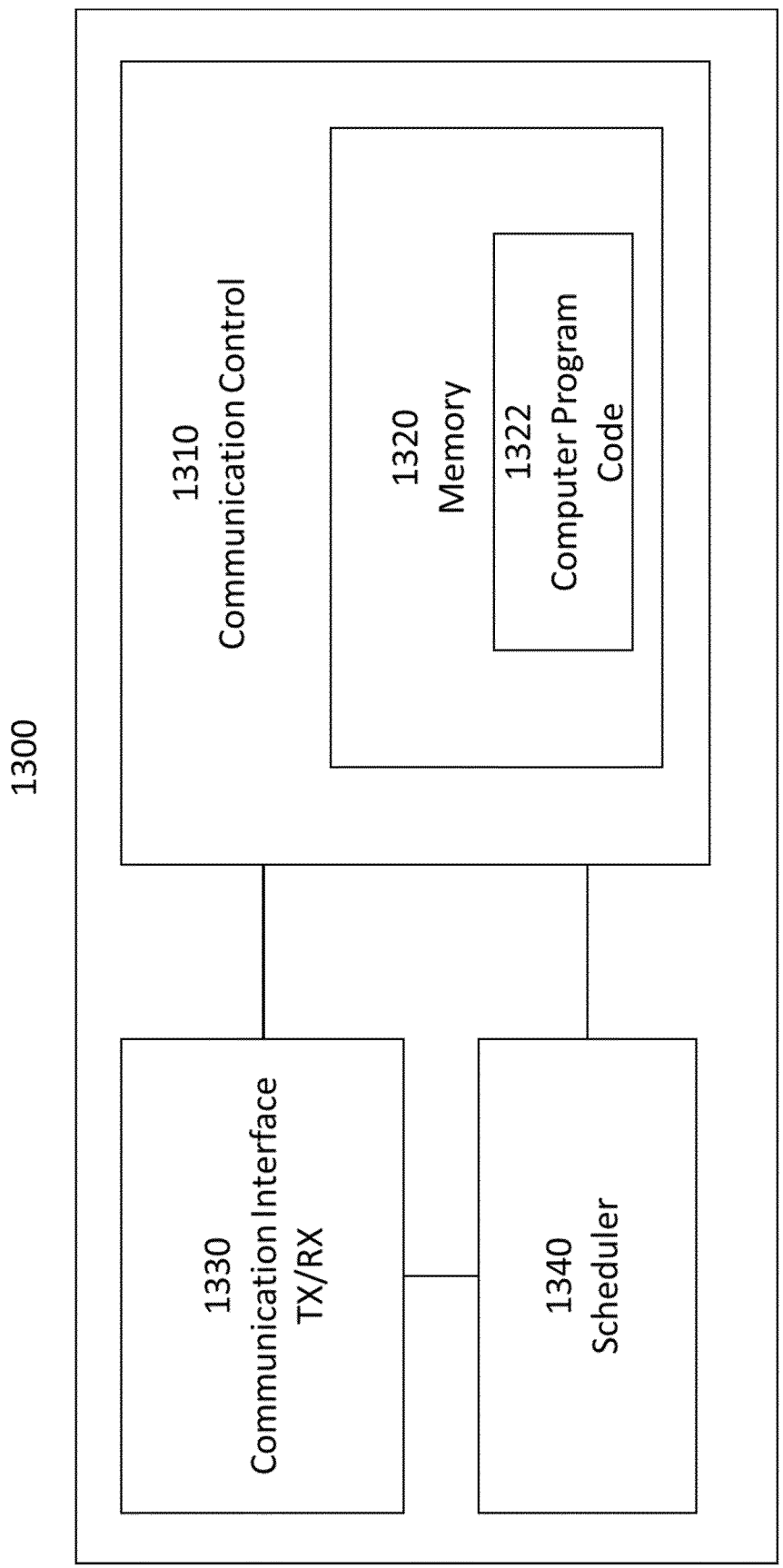

The apparatus 1300 of FIG. 13 illustrates an example embodiment of an apparatus that may be an access node or be comprised in an access node. The apparatus may be, for example, a circuitry or a chipset applicable to an access node to realize the described embodiments. The apparatus 1300 may be an electronic device comprising one or more electronic circuitries. The apparatus 1300 may comprise a communication control circuitry 1310 such as at least one processor, and at least one memory 1320 including a computer program code (software) 1322 wherein the at least one memory and the computer program code (software) 1322 are configured, with the at least one processor, to cause the apparatus 1300 to carry out any one of the example embodiments of the access node described above.

The memory 1320 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 1300 may further comprise a communication interface 1330 comprising hardware and/or software for realizing communication connectivity according to one or more communication protocols. The communication interface (1330) may provide the apparatus with radio communication capabilities to communicate in the cellular communication system. The communication interface may, for example, provide a radio interface to terminal devices. The apparatus 1300 may further comprise another interface towards a core network such as the network coordinator apparatus and/or to the access nodes of the cellular communication system. The apparatus 1300 may further comprise a scheduler 1340 that is configured to allocate resources.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor, and at least one memory including a computer program code, wherein the at least one memory and the computer program code are configured, with the at least one processor, to cause the apparatus to:
   receive a data packet and an indication of a coding function and parameters used for coding two or more data packets;
   determine if the received data packet is a coded data packet and if it is;
   determine if one or more internal buffers comprise a minimum set of data packets for generating the coded data packet, using sequence numbers assigned to each data packet, and if the one or more internal buffers comprise the minimum set of data packets:
      retrieve the minimum set of data packets from the one or more internal buffers; and
      decode the coded data packet using the minimum set of data packets and the coding function and parameters indicated by the indication received; and
   if it is determined that the one or more internal buffers do not comprise the minimum set of data packets:
      store the coded packet in the one or more internal buffers;
      receive one or more data packets;
      store the received one or more data packets in the one of more internal buffers;
      determine if the one or more internal buffers comprises a minimum set of data packets for generating the coded data packet, using sequence numbers assigned to each data packet and if the one or more internal buffers comprise the minimum set of data Packets;
      retrieve the minimum set of data packets from the one or more internal buffers needed to decode the coded data packet;
      decode the coded data packet using the minimum set of data packets and the coding function and parameters indicated by the indication received; and
      store the decoded data packet in the one or more internal buffers.

2. The apparatus according to claim 1, wherein:
   the decoded data packet is stored in the one or more internal buffers;
   the indication is received as part of the data packet.

3. The apparatus according to claim 1, wherein the indication is received as a flag or as an index embedded in a packet data convergence protocol header.

4. The apparatus according to claim 1, wherein the data packets stored in the one or more internal data buffers are stored in the one or more data buffers until a discard condition is met, wherein the discard condition is associated with an in-order delivery event that has been triggered or a packet discarding event.

5. The apparatus according to claim 1, wherein the apparatus is a gNodeB or a terminal device.

6. A method comprising:
   receiving a data packet and an indication of a coding function and parameters used for coding two or more data packets;
   determining if the received data packet is a coded data packet and if it is:
      determine if one or more internal buffers comprise a minimum set of data packets for generating the coded data packet, using sequence numbers assigned to each data packet, and if the one or more internal buffers comprise the minimum set of data packets;
      retrieve the minimum set of data packets from the one or more internal buffers; and
      decoding the coded data packet using the minimum set of data packets and the coding function and parameters indicated by the indication received; and
   if it is determined that the one or more internal buffers do not comprise the minimum set of data packets:
      store the coded packet in the one or more internal buffers;
   receive one or more data packets;
      store the received one or more data packets in the one of more internal buffers;
      determine if the one or more internal buffers comprises a minimum set of data packets for generating the coded data packet, using sequence numbers assigned to each data packet and if the one or more internal buffers comprise the minimum set of data packets;
      retrieve the minimum set of data packets from the one or more internal buffers needed to decode the coded data packet;
      decode the coded data packet using the minimum set of data packets and the coding function and parameters indicated by the indication received; and
      store the decoded data packet in the one or more internal buffers.

7. The method of claim 6, wherein:
   the decoded data packet is stored in the one or more internal buffers;
   the indication is received as part of the data packet.

8. The method of claim 6, wherein the indication is received as a flag or as an index embedded in a packet data convergence protocol header.

9. The method of claim 6, wherein the data packets stored in the one or more internal data buffers are stored in the one or more data buffers until a discard condition is met, wherein the discard condition is associated with an in-order delivery event that has been triggered or a packet discarding event.

10. The method of claim 6, wherein the data packet is received by a packet data convergence protocol layer from one or more upper layers; and
   the one or more upper layers comprise a service data adaptation layer.

11. The method of claim 6, further comprising:
   providing a second indication, wherein the second indication comprises one or more of the following: information identifying at least one data packet used to produce the coded data packet, information identifying one or more coding functions used produce the coded data packet, and/or information identifying one or more parameters that were used to produce the coded data packet.

12. The method of claim 11, wherein:
the second indication is provided in a header of a radio protocol;
the radio protocol is a packet data convergence protocol; and
the second indication is provided in the form of a flag or an index embedded in the header of the radio protocol.

13. The method of claim 11, wherein:
the second indication is at least partly configured using radio resource control signalling; and
the second indication is at least partly pre-defined.

14. One or more non-transitory computer-readable media comprising computer-executable instructions that, when executed by one or more processors, cause the one or more processors to perform the following operations:
receive a data packet and an indication of a coding function and parameters used for coding two or more data packets;
determine if the received data packet is a coded data packet and if it is:
 determine if one or more internal buffers comprise a minimum set of data packets for generating the coded data packet, using sequence numbers assigned to each data packet, and if the one or more internal buffers comprise the minimum set of data packets:
  retrieve the minimum set of data packets from the one or more internal buffers; and
  decode the coded data packet using the minimum set of data packets and the coding function and parameters indicated by the indication received; and
 if it is determined that the one or more internal buffers do not comprise the minimum set of data packets:
  store the coded packet in the one or more internal buffers;
  receive one or more data packets;
  store the received one or more data packets in the one of more internal buffers;
  determine if the one or more internal buffers comprises a minimum set of data packets for generating the coded data packet, using sequence numbers assigned to each data packet and if the one or more internal buffers comprise the minimum set of data packets;
  retrieve the minimum set of data packets from the one or more internal buffers needed to decode the coded data packet;
  decode the coded data packet using the minimum set of data packets and the coding function and parameters indicated by the indication received; and
store the decoded data packet in the one or more internal buffers.

15. The one or more non-transitory computer-readable media of claim 14, wherein:
the decoded data packet is stored in the one or more internal buffers;
the indication is received as part of the data packet.

16. The one or more non-transitory computer-readable media of claim 14, wherein the indication is received as a flag or as an index embedded in a packet data convergence protocol header.

17. The one or more non-transitory computer-readable media of claim 14, wherein the data packets stored in the one or more internal data buffers are stored in the one or more data buffers until a discard condition is met, wherein the discard condition is associated with an in-order delivery event that has been triggered or a packet discarding event.

18. The one or more non-transitory computer-readable media of claim 14, wherein the data packet is received by a packet data convergence protocol layer from one or more upper layers; and
the one or more upper layers comprise a service data adaptation layer.

19. The one or more non-transitory computer-readable media of claim 14, wherein the computer-executable instructions further cause the one or more processors to provide a second indication, wherein the second indication comprises one or more of the following:
information identifying at least one data packet used to produce the coded data packet,
information identifying one or more coding functions used produce the coded data packet, and/or
information identifying one or more parameters that were used to produce the coded data packet.

20. The one or more non-transitory computer-readable media of claim 19, wherein:
the second indication is provided in a header of a radio protocol;
the radio protocol is a packet data convergence protocol; and
the second indication is provided in the form of a flag or an index embedded in the header of the radio protocol.

* * * * *